United States Patent
Xu et al.

(10) Patent No.: US 10,863,406 B2
(45) Date of Patent: *Dec. 8, 2020

(54) CELL CHANGE METHOD, TERMINAL, AND NETWORK DEVICE

(71) Applicant: Huawei Technologies Co., Ltd., Shenzhen (CN)

(72) Inventors: Xiaoying Xu, Shanghai (CN); Dong Chen, Shanghai (CN); Bing Shu, Shenzhen (CN); Yinghong Yang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 168 days.

This patent is subject to a terminal disclaimer.

(21) Appl. No.: 16/101,171

(22) Filed: Aug. 10, 2018

(65) Prior Publication Data
US 2018/0352494 A1 Dec. 6, 2018

Related U.S. Application Data

(63) Continuation of application No. 15/064,409, filed on Mar. 8, 2016, now Pat. No. 10,075,889, which is a (Continued)

(30) Foreign Application Priority Data

Sep. 9, 2013 (WO) ................ PCT/CN2013/083132

(51) Int. Cl.
*H04W 36/30* (2009.01)
*H04W 24/10* (2009.01)
(Continued)

(52) U.S. Cl.
CPC ........... *H04W 36/30* (2013.01); *H04W 24/08* (2013.01); *H04W 36/0055* (2013.01); *H04W 36/0058* (2018.08); *H04W 24/10* (2013.01)

(58) Field of Classification Search
CPC ..... H04W 36/24; H04W 36/26; H04W 36/28; H04W 36/30; H04W 36/0005; H04W 36/0055–077
See application file for complete search history.

(56) References Cited

U.S. PATENT DOCUMENTS 9,479,974 B2 * 10/2016 Pani .................. H04W 36/0055
9,980,190 B2 *  5/2018 Vuorinen .............. H04W 36/18
(Continued)

FOREIGN PATENT DOCUMENTS

CN          1614916 A      5/2005
CN          1870815 A     11/2006
(Continued)

OTHER PUBLICATIONS

"Solution to enhance the eSCC mechanism" 3GPP TSG-RAN WG2 Meeting #84,San Francisco, USA,R2-134211,3rd Generation Partnership Project—Valbonne, France, pp. 1-4 (Nov. 11-15, 2013).
(Continued)

*Primary Examiner* — Robert C Scheibel
(74) *Attorney, Agent, or Firm* — Leydig, Voit & Mayer, Ltd.

(57) ABSTRACT

The present disclosure discloses a cell change method, a terminal, and a network device. By implementing this application, a problem that a receiving success rate of the change command cannot be improved when the another intra-frequency measurement event except the event 1D is triggered can be resolved.

26 Claims, 7 Drawing Sheets

Related U.S. Application Data continuation of application No. PCT/CN2014/072647, filed on Feb. 27, 2014.

(51) Int. Cl.
*H04W 36/00* (2009.01)
*H04W 24/08* (2009.01)

(56) References Cited

U.S. PATENT DOCUMENTS

| | | |
|---|---|---|
| 2006/0128312 A1 | 6/2006 | Declerck et al. |
| 2009/0245203 A1* | 10/2009 | Pani .................. H04W 36/30 370/331 |
| 2011/0014917 A1* | 1/2011 | Wager ............... H04W 36/0055 455/438 |
| 2011/0044292 A1 | 2/2011 | Eravelli et al. |
| 2011/0051692 A1* | 3/2011 | Sambhwani ...... H04W 36/0072 370/332 |
| 2011/0098042 A1 | 4/2011 | Tomasz et al. |
| 2012/0147855 A1 | 6/2012 | Pani et al. |
| 2012/0155429 A1* | 6/2012 | Lin ................... H04W 36/0005 370/331 |
| 2014/0044102 A1 | 2/2014 | Pani et al. |
| 2014/0120919 A1* | 5/2014 | Birdi ................. H04W 36/0055 455/437 |
| 2014/0128080 A1* | 5/2014 | Mohan ............ H04W 36/00835 455/437 |
| 2014/0135010 A1* | 5/2014 | Mohan .............. H04W 36/0083 455/436 |

FOREIGN PATENT DOCUMENTS

| | | |
|---|---|---|
| CN | 101077016 A | 11/2007 |
| CN | 101594632 A | 12/2009 |
| CN | 101635971 A | 1/2010 |
| CN | 201499308 U | 6/2010 |
| RU | 2457636 C2 | 7/2012 |

OTHER PUBLICATIONS

"3rd Generation Partnership Project;Technical Specification Group Radio Access Network; Radio Resource Control (RRC); Protocol specification(Release 11)," 3GPP TS 25.331 V11.6.0, 3rd Generation Partnership Project—Valbonne, France, pp. 1-2084 (Jun. 2013).

"3rd Generation Partnership Project;Technical Specification Group Radio Access Network;High Speed Downlink Packet Access (HSDPA);Overall description;Stage 2(Release 11)," 3GPP TS 25308 V11.5.0, 3rd Generation Partnership Project—Valbonne, France, pp. 1-76 (Jun. 2013).

* cited by examiner

CELL CHANGE METHOD, TERMINAL, AND NETWORK DEVICE

CROSS-REFERENCE TO RELATED APPLICATIONS

This application is a continuation of U.S. application Ser. No. 15/064,409, filed on Mar. 8, 2016, U.S. Pat. No. 10,075,889 which is a continuation of International Patent Application No. PCT/CN2014/072647, filed on Feb. 27, 2014, which claims priorities to International Patent Application No. PCT/CN2013/083132, filed on Sep. 9, 2013, All of the afore-mentioned patent applications are hereby incorporated by reference in their entireties.

TECHNICAL FIELD

Embodiments of the present disclosure relate to the field of wireless communications technologies, and in particular, to a cell change method, and further to a terminal and a network device.

BACKGROUND

In a current communications system, to increase wireless resource utilization and a network capacity of an entire system, a terminal may be handed over among multiple cells. When communication quality of a serving cell becomes increasingly poor, a network may control the serving cell to send a change command to the terminal, so that the terminal is handed over to another cell with the best communication quality in an active set. The active set refers to a set of cells to which a terminal establishes a connection. Data transmission between a user and a network is performed by using a cell in the active set.

However, because the communication quality of the serving cell is already extremely poor, when the serving cell sends the change command to the terminal, the terminal may not receive the change command, which causes a small transmission success rate of the change command. To improve this situation, a better approach at present is to use all cells except the serving cell in the active set as preconfigured cells, and a resource of a cell that serves as a serving cell is configured in advance for the terminal, where the preconfigured resource may include a type of a serving cell change completion message, a transaction identifier used by a serving cell completion message, indication information of whether serving cell change resets a media access control (MAC) layer entity, an identifier, of a user equipment (UE) in a preconfigured cell, configuration information of a pre-configured high-speed downlink shared channel (HS-DSCH) serving cell, and configuration information of an enhanced dedicated channel (E-DCH) serving cell, where the configuration information of the HS-DSCH serving cell refers to information about a resource, such as a channel, used by the UE after the preconfigured cell becomes a serving cell, and the configuration information of the E-DCH serving cell refers to information about a resource, such as a channel, used by the UE after the preconfigured cell becomes a serving cell. Afterwards, cell change is triggered according to an event 1D in intra-frequency measurement control, and when the preconfigured cell triggers the event 1D, the network controls this preconfigured cell to send a change command to the terminal, and the terminal completes a serving cell change process according to the change command. This process is also referred to as "enhanced serving cell change". For example, in US2011/0014917A1, improved configuration of HS-DSCH serving cell change is disclosed, and in this configuration, when a neighboring cell whose pilot signal strength is stronger than that of a current serving cell is detected (equivalent to triggering the event 1D), a change command is sent to the terminal by using this neighboring cell with stronger pilot signal strength.

In the conventional art, only the event 1D is considered when enhanced serving cell change is performed, but a non-event 1D in the intra-frequency measurement control is not considered, and the non-event 1D includes an event 1A, an event 1B, an event 1C, an event 1E, and an event 1F. If the serving cell or another cell triggers the event 1B, 1C, or 1F, there are two problems in the prior art: 1. The network cannot determine whether the terminal needs to perform serving cell change. 2. Even if the network can determine that the terminal needs to perform serving cell change, the network cannot determine cell information of a target cell for the serving cell change, because there may be at least one cell that is stronger than the serving cell in the active set. Therefore, when the non-event 1D is triggered, if the network determines that serving cell change needs to be performed, the network still controls the serving cell to send a change command, which still causes a small transmission success rate of the change command.

A definition of each event in the intra-frequency measurement control is as follows:

Event 1A: Pilot signal strength of a cell that does not belong to the active set increases, and a signal measurement value of a target cell enters a reporting range of relative active set quality.

Event 1B: Pilot signal strength of a cell in the active set reduces, and a signal measurement value of a target cell leaves a reporting range of relative active set quality.

Event 1C: Pilot signal strength of a cell outside the active set is greater than pilot signal strength of the poorest cell in the active set.

Event 1D: Pilot signal strength of a cell (not a serving cell) in the active set is greater than pilot signal strength of a current serving cell.

Event 1E: Pilot signal strength of a cell exceeds an absolute threshold.

Event 1F: Pilot signal strength of a cell is lower than an absolute threshold.

SUMMARY

To resolve the foregoing technical problem, the present disclosure provides a cell change method, a terminal, and a network device, which can resolve a problem that a transmission success rate of a change command cannot be improved when another intra-frequency measurement event except an event 1D is triggered.

A first aspect of the present disclosure provides a cell change method, where the change method includes: receiving, by a terminal, a measurement control message sent from a network device, and measuring a to-be-measured cell indicated in the measurement control message, to obtain a signal measurement value of each cell, where the to-be-measured cell includes a candidate cell in an active set, there is at least one candidate cell, and the candidate cell preconfigures a resource for the terminal; if the terminal determines, according to the signal measurement value of each cell, that any cell triggers an event 1D, determining the candidate cell that triggers the event 1D as a target cell, reporting a measurement report to the network device, and monitoring the target cell, so that the network device determines, according to the measurement report, the candidate cell that triggers the event 1D as the target cell and controls the target cell to send a change command to the terminal; if the terminal determines, according to the signal measurement value of each cell, that any cell triggers another intra-frequency measurement event except the event 1D, selecting, according to a preset rule, a specified cell from a candidate cell whose signal measurement value is greater than that of a serving cell, reporting a measurement report to the network device, and monitoring the specified cell, so that the network device determines, according to the measurement report, a target cell from the candidate cell whose signal measurement value is greater than that of the serving cell, and controls the target cell to send a change command to the terminal; and receiving, by the terminal, the change command, and using a resource of the target cell to perform serving cell change in the target cell according to the change command, where there is one specified cell or multiple specified cells, and the target cell is the specified cell or one of the specified cells.

With reference to the first aspect, in a first possible implementation manner of the first aspect, there is one specified cell, and the measurement report includes cell information of the specified cell, so that the network device determines the specified cell as the target cell according to the cell information of the specified cell.

With reference to the first aspect, in a second possible implementation manner of the first aspect, there is one specified cell, and the measurement report includes the signal measurement value of each cell, so that the network device determines, according to the preset rule, the target cell from the candidate cell whose signal measurement value is greater than that of the serving cell.

With reference to the first aspect, in a third possible implementation manner of the first aspect, there are at least two specified cells, and the measurement report includes signal measurement values of the at least two specified cells, so that the network device determines the target cell from the at least two specified cells.

With reference to any one of the first to the third possible implementation manners of the first aspect, in a fourth possible implementation manner of the first aspect, the measurement report further includes a change request, so that the network device determines, according to the change request, whether to control the target cell to send the change command to the terminal.

With reference to any one of the first to the third possible implementation manners of the first aspect, in a fifth possible implementation manner of the first aspect, the preset rule requires that the specified cell is a candidate cell with a largest signal measurement value or a candidate cell that has been in the active set for a longest time.

With reference to the fifth possible implementation manner of the first aspect, in a sixth possible implementation manner of the first aspect, if there are at least two candidate cells with a largest signal measurement value, the preset rule requires that the specified cell is a candidate cell that is listed in a preset location of the measurement report and has a largest signal measurement value.

With reference to the sixth possible implementation manner of the first aspect, in a seventh possible implementation manner of the first aspect, the preset rule requires that the specified cell is a candidate cell that is the first one or last one listed in the measurement report and has a largest signal measurement value.

With reference to the first aspect, in an eighth possible implementation manner of the first aspect, if the terminal determines, according to the signal measurement value of each cell, that any cell triggers the another intra-frequency measurement event except the event 1D, constructing a trigger identifier of the event 1D in the measurement report, so that the network device determines, according to the trigger identifier, that the specified cell triggers the event 1D.

With reference to the first aspect, in a ninth possible implementation manner of the first aspect, while or before the reporting a measurement report to the network device, the change method further includes: reporting, by the terminal, capability information to the network device, so that the network device determines, according to the capability information, whether the terminal supports the cell change or preconfiguration of a resource by the target cell when any cell triggers the another intra-frequency measurement event except the event 1D.

With reference to the first aspect, in a tenth possible implementation manner of the first aspect, the receiving, by the terminal, the change command from the target cell, and using the resource of the target cell to perform serving cell change in the target cell according to the change command includes: determining, by the terminal, whether the change command is received within a preset time; and if the change command is received within the preset time, using the resource of the target cell to perform serving cell change in the target cell according to the change command.

With reference to the tenth possible implementation manner of the first aspect, in an eleventh possible implementation manner of the first aspect, the receiving, by the terminal, the change command from the target cell, and using the resource of the target cell to perform serving cell change in the target cell according to the change command further includes: if the change command is not received within the preset time, stopping, by the terminal, monitoring the specified cell.

With reference to the tenth possible implementation manner of the first manner, in a twelfth possible implementation manner of the first aspect, before receiving the change command, the change method further includes: if the terminal determines, within the preset time, that any cell triggers an intra-frequency measurement event, reporting, by the terminal, a measurement report to the network device.

With reference to the first aspect, in a thirteenth possible implementation manner of the first aspect, the change method further includes: receiving, by the terminal, an active set update message from the network device, and deleting, from the active set according to the active set update message, the serving cell before the change.

A second aspect of the present disclosure provides a cell change method, where the change method includes: generating, by a network device, a measurement control message, and sending the measurement control message to a terminal, so that the terminal measures a to-be-measured cell indicated in the measurement control message, to obtain a signal measurement value of each cell, where the to-be-measured cell includes a candidate cell in an active set, there is at least one candidate cell, and the candidate cell preconfigures a resource for the terminal; receiving, by the network device, a measurement report reported by the terminal; if the measurement report is generated after the terminal determines, according to the signal measurement value of each cell, that any candidate cell triggers an event 1D, determining, by the network device according to the measurement report, the candidate cell that triggers the event 1D as a target cell, and controlling the target cell to send a change command to the terminal, so that the terminal uses a resource of the target cell to perform serving cell change in the target cell according to the change command; and if the measurement report is generated after the terminal determines, according to the signal measurement value of each cell, that any cell triggers another intra-frequency measurement event except the event 1D, determining, by the network device according to the measurement value, a target cell from a candidate cell whose signal measurement value is greater than that of a serving cell, and controlling the target cell to send a change command to the terminal, so that the terminal uses a resource of the target cell to perform serving cell change in the target cell according to the change command.

With reference to the second aspect, in a first possible implementation manner of the second aspect, while or before the reporting, by the network device, a measurement report reported by the terminal, the change method further includes: receiving, by the network device, capability information reported by the terminal; determining, by the network device according to the capability information, whether the terminal supports the serving cell change or preconfiguration of a resource by the target cell when any cell triggers the another intra-frequency measurement except the event 1D; if the network device determines that the terminal supports the serving cell change or the preconfiguration of a resource by the target cell, performing the step of determining, by the network device according to the measurement report, a target cell from a candidate cell whose signal measurement value is greater than that of a serving cell.

With reference to the second aspect, in a second possible implementation manner of the second aspect, the change method further includes: if the network device receives, before controlling the target cell to send the change command to the terminal, the measurement report reported by the terminal, determining, by the network device according to the measurement report, a new target cell from the candidate cell whose the signal measurement value is greater than that of the serving cell, and controlling the new target cell to send a change command to the terminal.

With reference to the second aspect, in a third possible implementation manner of the second aspect, the change method further includes: delivering, by the network device, an active set update message to the terminal, so that the terminal deletes, from an active set according to the active set update message, the serving cell before the change.

A third aspect of the present disclosure provides a terminal, where the terminal includes a receiving module, a measuring module, a monitoring module, a reporting module, and a changing module, where the receiving module is configured to receive a measurement control message sent from a network device; the measuring module is configured to: measure a to-be-measured cell indicated in the measurement control message, to obtain a signal measurement value of each cell, and determine, according to the signal measurement value of each cell, whether any candidate cell triggers an event 1D or whether any cell triggers another intra-frequency measurement event except the event 1D, where the to-be-measured cell includes a candidate cell in an active set, there is at least one candidate cell, and the candidate cell preconfigures a resource for the terminal; the monitoring module is configured to: when the measuring module determines that any candidate cell triggers the event 1D, monitor the candidate cell that triggers the event 1D, and configured to: when the measuring module determines that any cell triggers the another intra-frequency measurement event except the event 1D, select, according to a preset rule, a specified cell from a candidate cell whose signal measurement value is greater than that of a serving cell, and monitor the specified cell; the reporting module is configured to: when the measuring module determines that any candidate cell triggers the event 1D, report a measurement report to the network device, so that the network device determines, according to the measurement report, the candidate cell that triggers the event 1D as a target cell and controls the target cell to send a change command to the terminal, and configured to: when the measuring module determines that any cell triggers the another intra-frequency measurement event except the event 1D, report a measurement report to the network device, so that the network device determines, according to the measurement report, a target cell from the candidate cell whose signal measurement value is greater than that of the serving cell and controls the target cell to send a change command to the terminal; the receiving module is further configured to receive the change command from the target cell; the changing module is configured to use a resource of the target cell to perform serving cell change in the target cell according to the change command, where there is one specified cell or multiple specified cells, and the target cell is the specified cell or one of the specified cells.

With reference to the third aspect, in a first possible implementation manner of the third aspect, there is one specified cell, and the measurement report includes cell information of the specified cell, so that the network device determines the specified cell as the target cell according to the cell information of the specified cell.

With reference to the third aspect, in a second possible implementation manner of the third aspect, there is one specified cell, and the measurement report includes the signal measurement value of each cell, so that the network device determines, according to the preset rule, the target cell from the candidate cell whose signal measurement value is greater than that of the serving cell.

With reference to the third aspect, in a third possible implementation manner of the third aspect, there are at least two specified cells, and the measurement report includes signal measurement values of the at least two specified cells, so that the network device determines the target cell from the at least two specified cells.

With reference to any one of the first to the third possible implementation manners of the third aspect, in a fourth possible implementation manner of the third aspect, the measurement report further includes a change request, so that the network device determines, according to the change request, whether to control the target cell to send the change command to the terminal.

With reference to any one of the first to the third possible implementation manners of the third aspect, in a fifth possible implementation manner of the third aspect, the preset rule requires that the specified cell is a candidate cell with a largest signal measurement value or a candidate cell that has been in the active set for a longest time.

With reference to the fifth possible implementation manner of the third aspect, in a sixth possible implementation manner of the third aspect, if there are at least two candidate cells with a largest signal measurement value, the preset rule requires that the specified cell is a candidate cell that is listed in a preset location of the measurement report and has a largest signal measurement value.

With reference to the sixth possible implementation manner of the third aspect, in a seventh possible implementation manner of the third aspect, the preset rule requires that the specified cell is a candidate cell that is the first one or last one listed in the measurement report and has a largest signal measurement value.

With reference to the third aspect, in an eighth possible implementation manner of the third aspect, if the measuring module determines that any cell triggers the another intra-frequency measurement event except the event 1D, the reporting module is further configured to construct a trigger identifier of the event 1D in the measurement report, so that the network device determines, according to the trigger identifier, that the specified cell triggers the event 1D.

With reference to the third aspect, in a ninth possible implementation manner of the third aspect, the reporting module is further configured to: while or before reporting the measurement report to the network device, report capability information to the network device, so that the network device determines, according to the capability information, whether the terminal supports the serving cell change or preconfiguration of a resource by the target cell when any cell triggers the another intra-frequency measurement event except the event 1D.

With reference to the third aspect, in a tenth possible implementation manner of the third aspect, the changing module is configured to: determine whether the change command is received within a preset time, and when determining that the change command is received within the preset time, use the resource of the target cell to perform serving cell change in the target cell according to the change command.

With reference to the tenth possible implementation in the third aspect, in an eleventh possible implementation manner of the third aspect, the monitoring module is further configured to stop monitoring the specified cell when the changing module determines that the change command is not received within the preset time.

With reference to the tenth possible implementation manner of the third aspect, in a twelfth possible implementation manner of the third aspect, if before the changing module receives the change command, the measuring module determines, within the preset time, that any cell triggers an intra-frequency measurement event, the reporting module is further configured to report a measurement report to the network device.

With reference to the third aspect, in a thirteenth possible implementation manner of the third aspect, the receiving module is further configured to receive an active set update message from the network device; the terminal further includes an updating module, configured to delete, from the active set according to the active set update message, the serving cell before the change.

A fourth aspect of the present disclosure provides a network device, where the network device includes a sending module, a receiving module, and a processing module, where the sending module is configured to send a measurement control message to a terminal, so that the terminal measures a to-be-measured cell indicated in the measurement control message, to obtain a signal measurement value of each cell, where the to-be-measured cell includes a candidate cell in an active set, there is at least one candidate cell, and the candidate cell preconfigures a resource for the terminal; the receiving module is configured to receive a measurement report reported by the terminal; if the measurement report is generated after the terminal determines, according to the signal measurement value of each cell, that any candidate cell triggers an event 1D, the processing module is configured to: determine, according to the measurement report, the candidate cell that triggers the event 1D as a target cell, and control the target cell to send a change command to the terminal, so that the terminal uses a resource of the target cell to perform serving cell change in the target cell according to the change command; and if the measurement report is generated after the terminal determines, according to the signal measurement value of each cell, that any cell triggers another intra-frequency measurement event except the event 1D, the processing module is configured to: determine, according to the measurement report, a target cell from a candidate cell whose signal measurement value is greater than that of a serving cell, and control the target cell to send a change command to the terminal, so that the terminal uses a resource of the target cell to perform serving cell change in the target cell according to the change command.

With reference to the fourth aspect, in a first possible implementation manner of the fourth aspect, the network device further includes a determining module, where the receiving module is configured to: while or before receiving the measurement report reported by the terminal, receive capability information reported by the terminal; the determining module is configured to determine, according to the capability information, whether the terminal supports the serving cell change or preconfiguration of a resource by the target cell when any cell triggers the another intra-frequency measurement event except the event 1D; and the processing module is further configured to: when the determining module determines that the terminal supports the serving cell change or the preconfiguration of a resource by the target cell, determine, according to the measurement report, the target cell from the candidate cell whose signal measurement value is greater than that of the serving cell.

With reference to the fourth aspect, in a second possible implementation manner of the fourth aspect, if the receiving module receives, before the processing module controls the target cell to send the change command to the terminal, the measurement report reported by the terminal, the processing module is further configured to: receive the measurement report again from the receiving module, determine, according to the measurement report, a new target cell from the candidate cell whose signal measurement value is greater than that of the serving cell, and control the new target cell to send a change command to the terminal.

With reference to the fourth aspect, in a third possible implementation manner of the fourth aspect, the network device further includes a command updating module, and the command updating module is configured to generate an active set update message, and the sending module is configured to deliver the active set update message to the terminal, so that the terminal deletes, from the active set according to the active set update message, the serving cell before the change.

A fifth aspect of the present disclosure provides a terminal, where the terminal includes a processor, a receiver, and a transmitter, where the receiver is configured to receive a measurement control message sent from a network device; the processor is configured to: measure a to-be-measured cell indicated in the measurement control message, to obtain a signal measurement value of each cell, and determine, according to the signal measurement value of each cell, whether any candidate cell triggers an event 1D or whether any cell triggers another intra-frequency measurement event except the event 1D, where the to-be-measured cell includes a candidate cell in an active set, there is at least one candidate cell, and the candidate cell preconfigures a resource for the terminal; the processor is further configured to: when determining that any candidate cell triggers the event 1D, monitor a candidate cell that triggers the event 1D, and configured to: when determining that any cell triggers the another intra-frequency measurement event except the event 1D, select, according to a preset rule, a specified cell from a candidate cell whose signal measurement value is greater than that of a serving cell, and monitor the specified cell; the transmitter is configured to: when the processor determines that any candidate cell triggers the event 1D, report a measurement report to the network device, so that the network device determines, according to the measurement report, the candidate cell that triggers the event 1D as a target cell and controls the target cell to send a change command to the terminal, and configured to: when the processor determines that any cell triggers the another intra-frequency measurement event except the event 1D, report a measurement report to the network device, so that the network device determines, according to the measurement report, a target cell from the candidate cell whose signal measurement value is greater than that of the serving cell and controls the target cell to send a change command to the terminal; the receiver is further configured to receive the change command from the target cell; and the processor is configured to use a resource of the target cell to perform serving cell change in the target cell according to the change command, where there is one specified cell or multiple specified cells, and the target cell is the specified cell or one of the specified cells.

With reference to the fifth aspect, in a first possible implementation manner of the fifth aspect, there is one specified cell, and the measurement report includes cell information of the specified cell, so that the network device determines the specified cell as the target cell according to the cell information of the specified cell.

With reference to the fifth aspect, in a second possible implementation manner of the fifth aspect, there is one specified cell, and the measurement report includes the signal measurement value of each cell, so that the network device determines, according to the preset rule, the target cell from the candidate cell whose signal measurement value is greater than that of the serving cell.

With reference to the fifth aspect, in a third possible implementation manner of the fifth aspect, there are at least two specified cells, and the measurement report includes signal measurement values of the at least two specified cells, so that the network device determines the target cell from the at least two specified cells.

With reference to any one of the first to the third possible implementation manners of the fifth aspect, in a fourth possible implementation manner of the fifth aspect, the measurement report further includes a change request, so that the network device determines, according to the change request, whether to control the target cell to send the change command to the terminal.

With reference to any one of the first to the third possible implementation manners of the fifth aspect, in a fifth possible implementation manner of the fifth aspect, the preset rule requires that the specified cell is a candidate cell with a largest signal measurement value or a candidate cell that has been in the active set for a longest time.

With reference to the fifth possible implementation manner of the third aspect, in a sixth possible implementation manner of the fifth aspect, if there are at least two candidate cells with a largest signal measurement value, the preset rule requires that the specified cell is a candidate cell that is listed in a preset location of the measurement report and has a largest signal measurement value With reference to the sixth possible implementation manner of the third aspect, in a seventh possible implementation manner of the fifth aspect, the preset rule requires that the specified cell is a candidate cell that is the first one or last one listed in the measurement report and has a largest signal measurement value.

With reference to the fifth aspect, in an eighth possible implementation manner of the fifth aspect, if the processor determines that any cell triggers the another intra-frequency measurement event except the event 1D, the transmitter is further configured to construct a trigger identifier of the event 1D in the measurement report, so that the network device determines, according to the trigger identifier, that the specified cell triggers the event 1D.

With reference to the fifth aspect, in a ninth possible implementation manner of the fifth aspect, the transmitter is further configured to: while or before reporting the measurement report to the network device, report capability information to the network device, so that the network device determines, according to the capability information, whether the terminal supports the cell change or preconfiguration of a resource by the target cell when any cell triggers the another intra-frequency measurement event except the event 1D.

With reference to the fifth aspect, in a tenth possible implementation manner of the fifth aspect, the processor is configured to: determine whether the change command is received within a preset time, and when determining that the change command is received within the preset time, use the resource of the target cell to perform serving cell change in the target cell according to the change command.

With reference to the tenth possible implementation manner of the fifth aspect, in an eleventh possible implementation manner of the fifth aspect, the processor is further configured to stop monitoring the specified cell when the receiver determines that the change command is not received within the preset time.

With reference to the tenth possible implementation manner of the fifth aspect, in a twelfth possible implementation manner of the fifth aspect, if before the receiver receives the change command, the processor determines, within the preset time, that any cell triggers the intra-frequency measurement event, the transmitter is further configured to report a measurement report to the network device.

With reference to the fifth aspect, in a thirteenth possible implementation manner of the fifth aspect, the receiver is further configured to receive an active set update message from the network device, and the processor is further configured to delete, from the active set according to the active set update message, the serving cell before the change.

A sixth aspect of the present disclosure provides a network device, where the network device includes a transmitter, a receiver, and a processor, where the transmitter is configured to send a measurement control message to a terminal, so that the terminal measures a to-be-measured cell indicated in the measurement control message, to obtain a signal measurement value of each cell, where the to-be-measured cell includes a candidate cell in an active set, there is at least one candidate cell, and the candidate cell preconfigures a resource for the terminal; the receiver is configured to receive a measurement report reported by the terminal; if the measurement report is generated after the terminal determines, according to the signal measurement value of each cell, that any candidate cell triggers an event 1D, the processor is configured to: determine, according to the measurement report, the candidate cell that triggers the event 1D as a target cell, and control the target cell to send a change command to the terminal, so that the terminal uses a resource of the target cell to perform serving cell change in the target cell according to the change command; and if the measurement report is generated after the terminal determines, according to the signal measurement value of each cell, that any cell triggers another intra-frequency measurement event except the event 1D, the processor is configured to: determine, according to the measurement report, a target cell from the candidate cell whose signal measurement value is greater than that of a serving cell, and control the target cell to send a change command to the terminal, so that the terminal uses a resource of the target cell to perform serving cell change in the target cell according to the change command.

With reference to the sixth aspect, in a first possible implementation manner of the sixth aspect, the receiver is further configured to receive capability information reported by the terminal; the processor is further configured to determine, according to the capability information, whether the terminal supports the serving cell change or preconfiguration of a resource by the target cell when any cell triggers the another intra-frequency measurement event except the event 1D; and further configured to: when it is determined that the terminal supports the serving cell change or the preconfiguration of a resource by the target cell, according to the measurement report, the target cell from the candidate cell whose signal measurement value is greater than that of the serving cell.

With reference to the sixth aspect, in a second possible implementation manner of the sixth aspect, if the receiver receives, before the processor controls the target cell to send the change command to the terminal, the measurement report reported by the terminal, the processor is further configured to: receive the measurement report again from the receiver, determine, according to the measurement report, a new target cell from the candidate cell whose signal measurement value is greater than that of the serving cell, and control the new target cell to send a change command to the terminal.

With reference to the sixth aspect, in a third possible implementation manner of the sixth aspect, the processor is further configured to generate an active set update message, and the transmitter is further configured to deliver the active set update message to the terminal, so that the terminal deletes, from the active set according to the active set update message, the serving cell before the change.

In summary, according to the cell change method, the terminal, and the network device of the present disclosure, when it is determined that any cell triggers another intra-frequency measurement event except an event 1D, the terminal determines, according to a preset rule, a specified cell from a candidate cell whose signal measurement value is greater than that of a serving cell and monitors the specified cell; the network device determines a target cell from the candidate cell whose signal measurement value is greater than that of the serving cell, the target cell is the specified cell or one of specified cells, and the candidate cell preconfigures a resource for the terminal before any cell triggers another intra-frequency measurement event except the event 1D, so that the terminal may receive a change command from the target cell, and use a resource of the target cell to perform serving cell change in the target cell according to the change command. Because a signal measurement value of the specified cell is greater than the signal measurement value of the serving cell, a transmission success rate of the change command can be significantly improved, thereby resolving a problem that a transmission success rate of the change command cannot be improved when the another intra-frequency measurement event except the event 1D is triggered; in addition, because the target cell has preconfigured the resource, signaling overheads can be reduced, so that the serving cell change process can be rapidly performed.

The foregoing explanation is merely an outline of a technical solution of the present disclosure. To understand a technical means of the present disclosure more clearly, to implement the present disclosure according to content of the specifications, and to make the foregoing and other objectives, features, and advantages of the present disclosure more apparent and understandable, exemplary embodiments are enumerated in the following. With reference to the accompanying drawings, explanation is as follows.

DESCRIPTION OF EMBODIMENTS

The following describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

Figure 1:
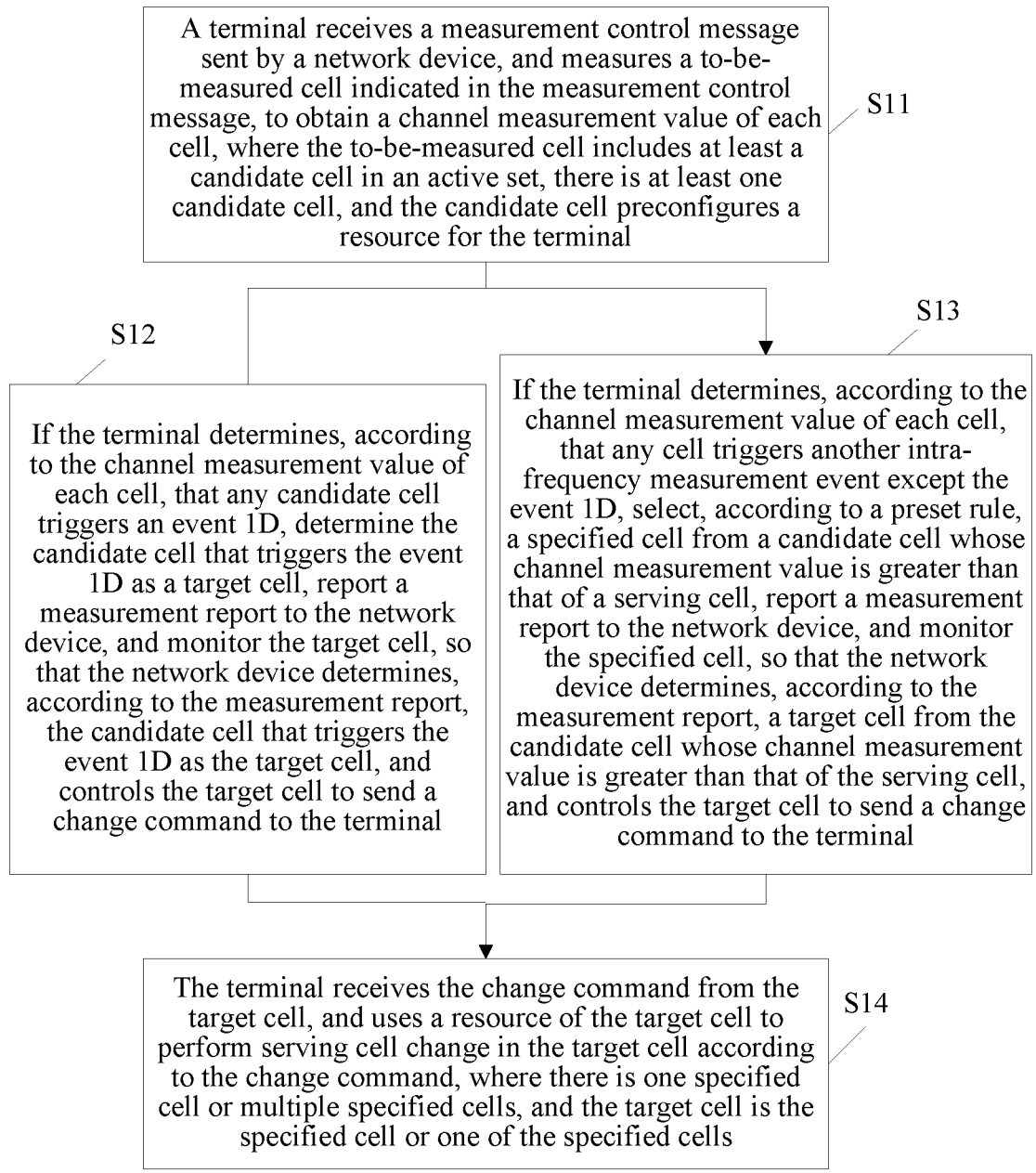
FIG. 1 is a schematic flowchart of a first embodiment of a cell change method according to the present disclosure.

FIG. 1 is a schematic flowchart of a first embodiment of a cell change method according to the present disclosure.

S11: A terminal receives a measurement control message sent from a network device, and measures a to-be-measured cell indicated in the measurement control message, to obtain a signal measurement value of each cell, where the to-be-measured cell includes a candidate cell in an active set, there is at least one candidate cell, and the candidate cell preconfigures a resource for the terminal.

The signal measurement value may be an received signal code power (RSCP) value or an Ec/No (received energy per chip divided by the power density in the band) value of pilot signal strength, or may be an accumulated value of an RSCP value or an Ec/No value of pilot signal strength and a cell individual offset (CIO) value. A pilot signal refers to a signal sent in a telecommunications network for a purpose of measurement or monitoring. The active set includes a serving cell and a candidate cell, where the serving cell is a cell that provides a high speed downlink shared channel (HS-DSCH) service or an enhanced dedicated channel (E-DCH) service for the terminal, and the candidate cell is a cell that does not provide the HS-DSCH service or the E-DCH service for the terminal but establishes a link to the terminal, or a cell that provides the HS-DSCH service or the E-DCH service for the terminal but serves as a coordinated cell of the serving cell. A cell outside the active set may be a cell in a set such as a monitoring set or a detection set.

The resource preconfigured by the candidate cell includes at least a channel resource, an air interface resource, and the like. The active set includes at least one candidate cell.

S12: If the terminal determines, according to the signal measurement value of each cell, that any candidate cell triggers an event 1D, determines the candidate cell that triggers the event 1D as a target cell, reports a measurement report to the network device, and monitors the target cell, so that the network device determines, according to the measurement report, the candidate cell that triggers the event 1D as the target cell, and controls the target cell to send a change command to the terminal.

S13: If the terminal determines, according to the signal measurement value of each cell, that any cell triggers another intra-frequency measurement event except the event 1D, selects, according to a preset rule, a specified cell from a candidate cell whose signal measurement value is greater than that of a serving cell, reports a measurement report to the network device, and monitors the specified cell, so that the network device determines, according to the measurement report, a target cell from the candidate cell whose signal measurement value is greater than that of the serving cell, and controls the target cell to send a change command to the terminal.

The another intra-frequency measurement event except the event 1D is a non-event 1D. Because the specified cell is selected from the candidate cell whose signal measurement value is greater than that of the serving cell, regardless of whether the serving cell or the candidate cell triggers the non-event 1D, it indicates that the signal measurement value of the serving cell is not the largest.

For example, when the serving cell triggers an event 1B or an event 1F, it indicates that the signal measurement value of the serving cell is already lower than a threshold and this situation is kept for a period of time, for example, the terminal is increasingly far from the serving cell. For example, a threshold T and time t are given in the measurement control message, where the threshold T may be a signal measurement value of a candidate cell in the active set, or may be a preset signal measurement value. If the signal measurement value of the serving cell is lower than T and this situation is kept for time μl, a trigger condition for the event 1B or the event 1F is met, where a value of t is generally 640 ms. In addition, this event may indicate that the signal measurement value of the serving cell is at least a specified threshold lower than a largest signal measurement value of a candidate cell in the active set. If a candidate cell triggers the event 1B or 1F, it indicates that the signal measurement value of the serving cell is greater than that of this candidate cell, but is still lower than those of some other candidate cells.

If the serving cell triggers an event 1C, it indicates that the serving cell is a cell that has a smallest signal measurement value in the active set, and a signal measurement value of a cell outside the active set is greater than the signal measurement value of the serving cell. This situation is kept for a period of time, and a value of this time is 320 ms. If a candidate cell triggers the event 1C, it indicates that this candidate cell is a cell that has a smallest signal measurement value in the active set, but the serving cell in this case is not a cell that has a largest signal measurement value in the active set.

In addition, when a candidate cell in the active set or a cell outside the active set triggers an event 1E, a situation in which the signal measurement value of the candidate cell is greater than that of the serving cell may also exist.

When a terminal triggers the non-event 1D, generally, a cell that triggers the non-event 1D is not a target cell for serving cell change. For example, when the event 1B is triggered, a target cell that triggers the event 1B is a cell to be deleted; when the event 1C is triggered, a target cell that triggers the event 1C is a cell to be replaced. In addition, the target cell may not be a candidate cell whose signal measurement value is greater than that of the serving cell.

In this embodiment, preferably, the serving cell triggers the event 1B, 1C, or 1F.

S14: The terminal receives the change command from the target cell, and uses a resource of the target cell to perform serving cell change in the target cell according to the change command, where there is one specified cell or multiple specified cells, and the target cell is the specified cell or one of the specified cells.

Because the target cell is the specified cell or one of the specified cells, the specified cell monitored by the terminal certainly includes the target cell, so that the change command may be received from the target cell. The terminal cannot immediately receive the change command after reporting the measurement report, but monitors the target cell after reporting the measurement report, to wait for the target cell to send the change command. In this embodiment, the change command is sent at a physical layer. For example, the change command is a high speed shared control channel (HS-SCCH) Order.

When the terminal performs serving cell change, because the target cell has preconfigured the resource for the terminal, the terminal does not need to request the target cell to send information about the configured resource, and only needs to receive the change command and rapidly complete the serving cell change.

In the cell change method provided in this embodiment of the present disclosure, a candidate cell in an active set preconfigures a resource for a terminal. If any cell triggers another intra-frequency measurement event except an event 1D, the terminal determines a specified cell from a candidate cell whose signal measurement value is greater than that of a serving cell, and monitors the specified cell; a network device determines a target cell from the candidate cell whose signal measurement value is greater than that of the serving cell, and controls the target cell to send a change command. The target cell is the specified cell or one of specified cells, a signal measurement value of the specified cell is greater than the signal measurement value of the serving cell, and the target cell has preconfigured a resource for the terminal, so that a problem that a transmission success rate of the change command cannot be improved when the another intra-frequency measurement event except the event 1D is triggered can be resolved, and signaling overheads can be reduced, and a serving cell change process can be rapidly performed.

Figure 2:
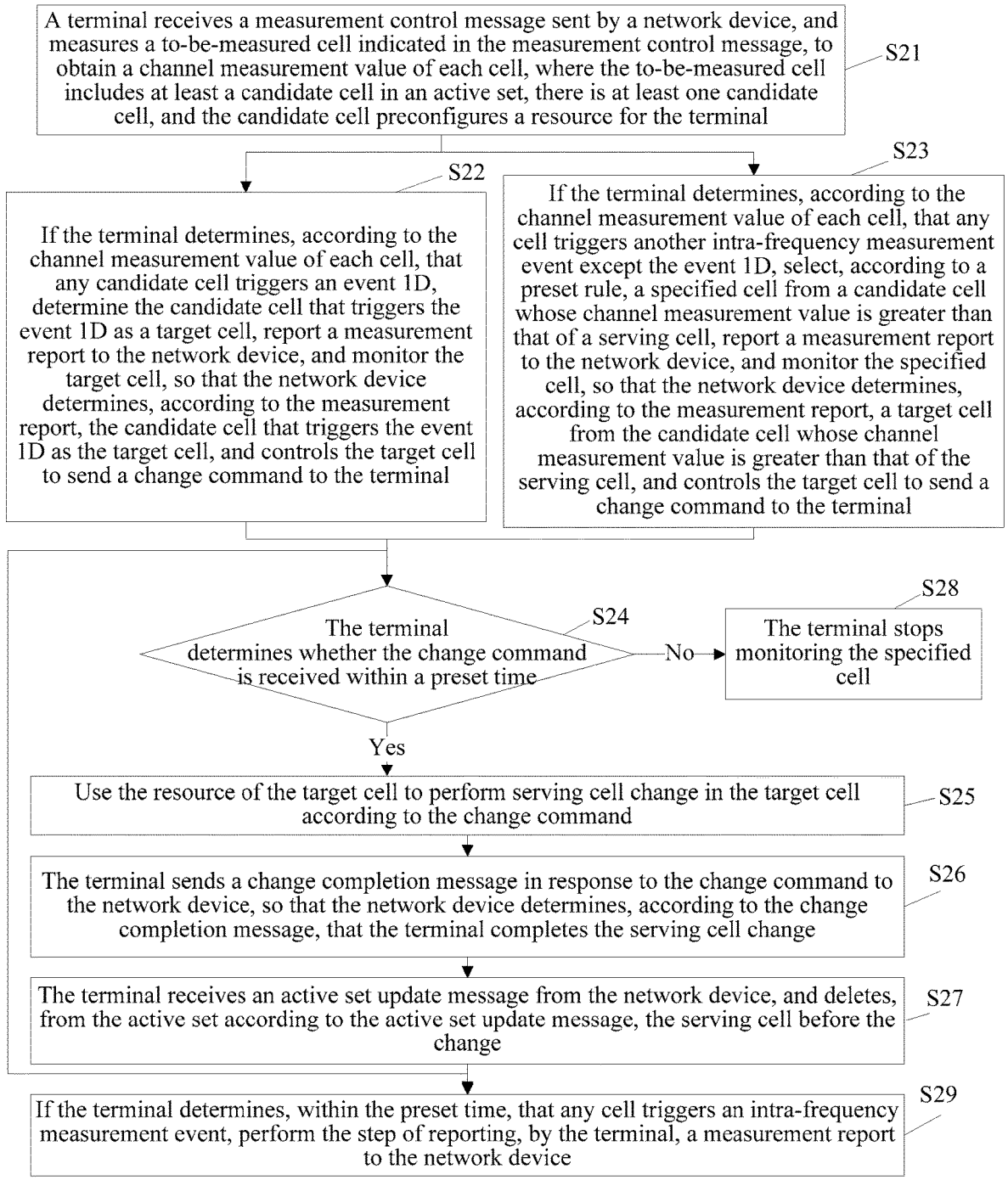
FIG. 2 is a schematic flowchart of a second embodiment of a cell change method according to the present disclosure.

FIG. 2 is a schematic flowchart of a second embodiment of a cell change method according to the present disclosure.

S21: A terminal receives a measurement control message sent from a network device, and measures a to-be-measured cell indicated in the measurement control message, to obtain a signal measurement value of each cell, where the to-bemeasured cell includes a candidate cell in an active set, there is at least one candidate cell, and the candidate cell preconfigures a resource for the terminal.

For details about S21, refer to S11 in the first embodiment, and the details are not described herein again.

S22: If the terminal determines, according to the signal measurement value of each cell, that any candidate cell triggers an event 1D, determines the candidate cell that triggers the event 1D as a target cell, reports a measurement report to the network device, and monitors the target cell, so that the network device determines, according to the measurement report, the candidate cell that triggers the event 1D as the target cell, and controls the target cell to send a change command to the terminal.

S23: If the terminal determines, according to the signal measurement value of each cell, that any cell triggers another intra-frequency measurement event except the event 1D, selects, according to a preset rule, a specified cell from a candidate cell whose signal measurement value is greater than that of a serving cell, reports a measurement report to the network device, and monitors the specified cell, so that the network device determines, according to the measurement report, a target cell from the candidate cell whose signal measurement value is greater than that of the serving cell, and controls the target cell to send a change command to the terminal.

In this embodiment, preferably, the serving cell triggers an event 1B, 1C, or 1F. There are multiple implementation manners of determining, by the network device, a target cell to which the serving cell is changed. Some examples are described in detail by reference to the following situations:

In a first situation, there is one specified cell. In this case, the measurement report includes cell information of the specified cell, so that the network device determines the specified cell as the target cell according to the cell information of the specified cell. That is, when the terminal determines the specified cell, the network device does not know which candidate cell is determined as the specified cell by the terminal, and therefore the terminal needs to report, in the measurement report, the cell information of the specified cell to the network device. The cell information may be a scrambling code or a cell identifier of the specified cell.

Another implementation manner of determining, by the terminal, the specified cell according to the preset rule is to select any candidate cell whose signal measurement value is greater than that of the serving cell as the specified cell.

In a second situation, there is one specified cell. In this case, the measurement report includes the signal measurement value of each cell, so that the network device determines, according to the preset rule, the target cell from the candidate cell whose signal measurement value is greater than that of the serving cell. Because the terminal obtains the signal measurement value of each cell, the terminal can know which candidate cell has greater signal measurement value than that of the serving cell, so that the specified cell may be determined according to the preset rule.

Another implementation manner of determining, by the terminal, the specified cell according to the preset rule is to select a cell whose signal measurement value is greater than that of the serving cell and has a largest measurement value among the candidate cell as the specified cell. Similarly, a network side determines the target cell according to this rule, which can ensure that a specified cell determined by the terminal and a target cell determined by the network device are consistent.

In a third situation, there are at least two specified cells. In this case, the measurement report also includes a signal measurement value of each specified cell, so that the network device determines the target cell from the at least two specified cells. The target cell determined by the network device may be any one of the specified cells. Because signal measurement values of the specified cells are greater than the signal measurement value of the serving cell, a signal measurement value of the target cell is certainly greater than the signal measurement value of the serving cell. Because the target cell is one of the specified cells, the terminal must monitor all specified cells, and certainly, the terminal may also monitor the target cell.

In the foregoing second and third situations, the measurement report may also include a comparison result of the signal measurement value. For example, in the second situation, the measurement report includes only the comparison result of the signal measurement value of each cell, but does not carry the signal measurement value of each cell. For example, the comparison result is a descending order relationship of all cells according to the signal measurement value, and then, the network device can directly know, from the comparison result, which candidate cell has a greater signal measurement value than that of the serving cell, and which candidate cell has a largest signal measurement value.

In the foregoing three situations, the preset rule may require that the specified cell is a candidate cell that has a largest signal measurement value among the candidate cell whose signal measurement value is greater than that of the serving cell, a candidate cell that has been in the active set for a longest time among the candidate cell whose signal measurement value is greater than that of the serving cell, or a candidate cell that is the first to join the active set among the candidate cell whose signal measurement value is greater than that of the serving cell. If there are at least two cells in the active set that have a same largest signal measurement value, the preset rule may require that the specified cell is determined according to a cell sequence in the measurement report. For example, it is stipulated that an Nth candidate cell that has a largest signal measurement value in a measurement result list is the specified cell, where $1 \leq N \leq m$, m is a quantity of cells in the active set. Preferably, the specified cell may be a first candidate cell that has a largest signal measurement value, and a measurement result of this candidate cell is the first one or last one listed in the measurement result list. Regardless of how the preset rule changes, the signal measurement value of the specified cell must be greater than the signal measurement value of the serving cell, and the specified cell determined by the terminal includes at least the target cell determined by the network. Because the measurement report includes the signal measurement value of each cell, the network device may determine the target cell according to a preset rule that is the same as that of the terminal.

In this embodiment, while or before the terminal reports the measurement report to the network device, the terminal further reports capability information to the network device, so that the network device determines, according to the capability information, whether the terminal supports serving cell change or preconfiguration of a resource by the target cell, that is, "enhanced serving cell change", when any cell triggers the another intra-frequency measurement event except the event 1D. If the terminal does not support the serving cell change or the preconfiguration of a resource by the target cell, the network device may not perform a next operation after receiving the measurement report.

In this embodiment, after the terminal sends a measurement report of a non-event 1D, the network device may learn, by using content of the measurement report, that the terminal requests to perform serving cell change. The content may be one of the following:

1. The serving cell triggers the non-event 1D.
2. The signal measurement value of the serving cell is the smallest in the active set.
3. There is no cell information of a candidate cell that triggers the non-event 1D, or cell information of the specified cell.
4. A serving cell change request, where the change request is used by the network device to determine whether to control the target cell to send the change command to the terminal.
5. Capability information of supporting enhanced serving cell change.
6. An activation time offset used to calculate duration of monitoring activation time of the specified cell.
7. Duration used to indicate monitoring of activation time of the specified cell.
8. Capability information of supporting the preconfiguration of a resource by the target cell.

In this embodiment, when the terminal determines, according to the signal measurement value of each cell, that any cell triggers the another intra-frequency measurement event except the event 1D, a special event 1D may be constructed, that is, constructing, in the measurement report, a trigger identifier of the event 1D, and this trigger identifier is used by the network device to determine that the specified cell triggers the event 1D. The special event 1D refers to that the specified cell actually does not trigger the event 1D, and the event 1D is fabricated by the terminal. Alternatively, the trigger identifier may be a special value that is mutually agreed on by the terminal and the network device, or may be a value of a measurement identifier, delivered by the network device, of the event 1D. After determining, according to the trigger identifier, that the specified cell triggers the event 1D, the network device may perform an enhanced serving cell change process.

S24: The terminal determines whether the change command is received within a preset time; if the change command is received within the preset time, performs S24; if the change command is not received within the preset time, performs S27.

Because the target cell is the specified cell monitored by the terminal, when the target cell sends the change command, the change command can be received by the terminal.

The terminal may carry the activation time offset when reporting the measurement report, and the preset time is a current connection frame number (CFN) when reporting the measurement report plus the activation time offset. In wireless communication, especially in an air interface synchronization configuration instruction, the network device generally needs to add the activation time offset to signaling, and the activation time offset specifies a frame number that causes changed configuration of the terminal to take effect. Herein, the activation time offset indicates duration in which the terminal monitors the specified cell.

If the measurement report does not carry the activation time offset, the terminal may determine, by timing with a timer, whether the preset time is exceeded.

S25: Use a resource of the target cell to perform serving cell change in the target cell according to the change command.

When the terminal performs the serving cell change, because the target cell has preconfigured the resource for the terminal, the terminal does not need to request the target cell to send information about the configured resource, and only needs to receive the change command and rapidly complete the serving cell change, which reduces signaling overheads. If the terminal monitors multiple specified cells, monitoring of all specified cells may be stopped when the terminal receives the change command from a specified cell, and in this case, the specified cell that sends the change command is the target cell.

S26: The terminal sends a change completion message in response to the change command to the network device, so that the network device determines, according to the change completion message, that the terminal completes the serving cell change.

When the candidate cell preconfigures the resource for the terminal, the terminal may be notified of cell information of the candidate cell that preconfigures the resource. For example, the network device may send a list of preconfigured information to the terminal, and the list of preconfigured information may include at least one piece of the following information: a type of a message that is used to indicate change completion and is sent to the target cell after the serving cell change is completed, a transaction identifier used when the serving cell change is completed, indication information of whether a MAC layer is reset when the serving cell change is completed, an air interface identifier used in a serving cell change process, related configuration information of an HS-DSCH resource when the serving cell provides an HS-DSCH service for the terminal, and related configuration information of an E-DCH resource when the serving cell provides an E-DCH service for the terminal. The change completion message is obtained from the message type in the foregoing list.

S27: The terminal receives an active set update message from the network device, and deletes, from the active set according to the active set update message, the serving cell before the change.

If the original serving cell, that is, the serving cell before the serving cell change is performed, triggers the event 1B, active set update information is used to instruct the terminal to delete the original serving cell from the active set. If the original serving cell triggers the event 1C, the active set update information is used to instruct the terminal to delete the original serving cell from the active set, and add, to the active set, a cell that is outside the active set and whose signal measurement value is greater than that of the original serving cell, that is, a cell that triggers the event 1C.

Further, if a cell outside the active set triggers the event 1E, and a capacity of the active set does not reach an upper limit, the terminal may add this cell to the active set according to the active set update message. If the capacity of the active set has reached the upper limit, the terminal may delete, according to the active set update message, a candidate cell that has a smallest signal measurement value in the active set, and add this cell outside the active set to the active set. It should be noted that, because the terminal has completed the serving cell change, the original serving cell becomes the candidate cell, and therefore, the candidate cell that has a smallest signal measurement value may be the primary serving cell.

S28: The terminal stops monitoring the specified cell.

S29: If the terminal determines, within the preset time, that any cell triggers an intra-frequency measurement event, it performs the step of reporting, by the terminal, a measurement report to the network device.

Generally, the terminal periodically performs intra-frequency measurement control. If the terminal determines that any cell triggers the intra-frequency measurement event, that is, any cell triggers any event of the event 1A, the event 1B, the event 1C, the event 1D, the event 1E, and the event 1F before the change command is received and before the preset time is exceeded, the terminal reports the measurement report to the network device and recalculates time for monitoring the specified cell, so that the network device redetermines a target cell according to the measurement report.

There is a sequence of triggering an event by the terminal. For example, after the terminal sends a measurement report of the event 1B, if a change command is not received and the event 1D is triggered, a measurement report of the event 1D may be sent to the network device.

In another embodiment, after the terminal sends a measurement report for the first time, and when the terminal determines, within a preset time for waiting to receive a change command, that any cell triggers an intra-frequency measurement event, the terminal may not report the measurement report to the network device, or may not recalculate time for monitoring a specified cell, but continues to wait to receive the change command.

Further, corresponding specified cells determined when the terminal sends two measurement reports in succession are different. For example, the specified cells determined by the terminal twice in succession are candidate cells that have a largest signal measurement value, but the candidate cells that have a largest signal measurement value and are determined twice in succession are not a same candidate cell. Then, the terminal may report a measurement report again to the network device, so that the network device redetermines a target cell according to the measurement report. A manner for determining the target cell is not described in detail herein.

Further, if corresponding specified cells determined when two measurement reports are sent in succession by the terminal are inconsistent, the terminal may at the same time monitor the specified cells that are determined twice in succession, and the network device may certainly select one specified cell, as the target cell, from the specified cells determined twice in succession.

Figure 3:
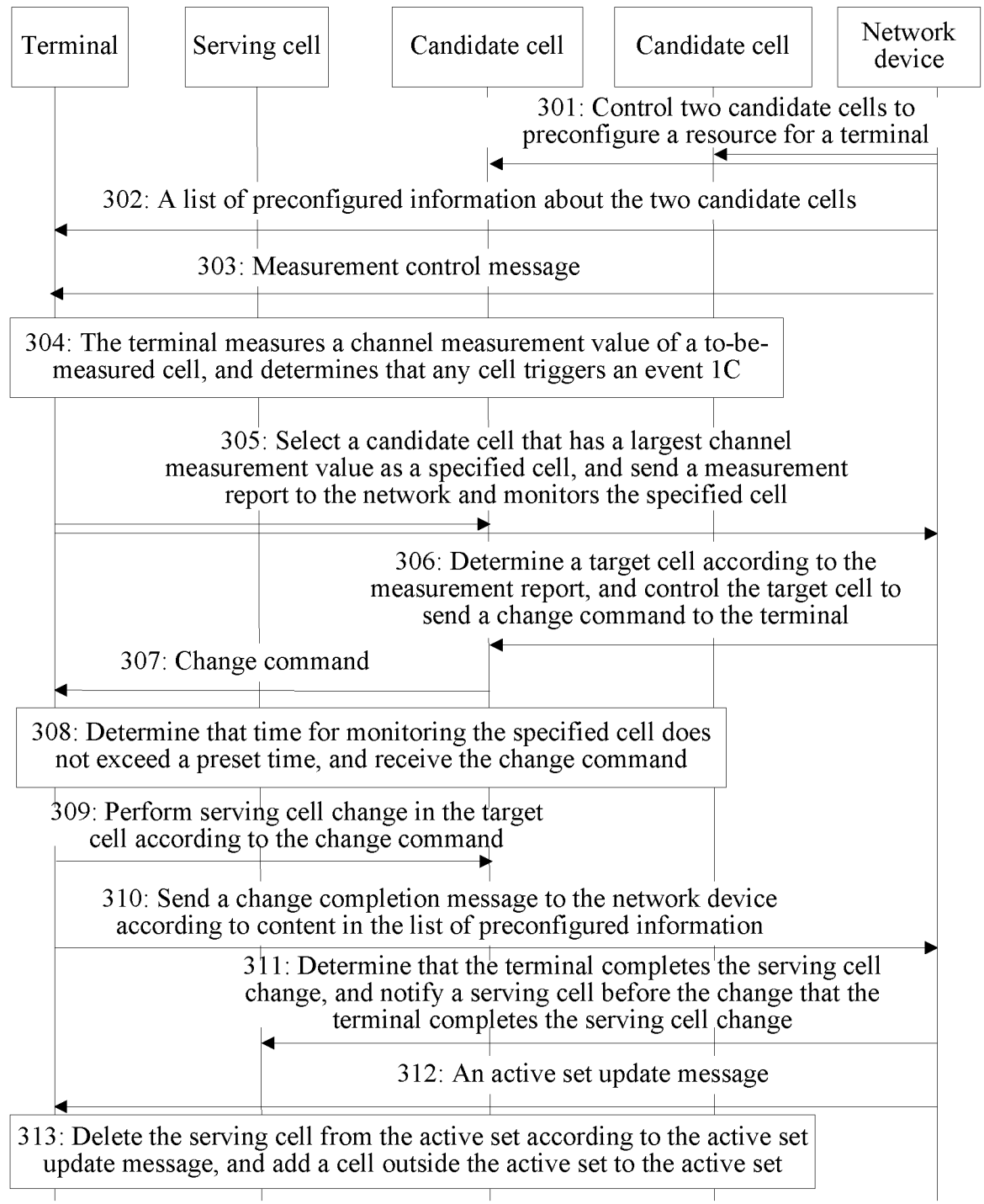
FIG. 3 is a schematic signaling diagram of an application scenario of the cell change method shown in FIG. 2.

FIG. 3 is a schematic signaling diagram of an application scenario of the cell change method shown in FIG. 2. In this application scenario, schematically, an active set includes only two candidate cells, and a signaling process is as follows:

S301: A network device controls the two candidate cells to preconfigure a resource for a terminal.

S302: The network device sends a list of preconfigured information about the two candidate cells to the terminal.

The list of preconfigured information indicates that the two candidate cells have already completed the preconfiguration of the resource for the terminal.

S303: The network device sends a measurement control message to the terminal.

A to-be-measured cell is indicated in the measurement control message, where the to-be-measured cell includes a candidate cell in the active set, and may further include a cell outside the active set, and the candidate cell preconfigures a resource for the terminal.

S304: The terminal measures a signal measurement value of the to-be-measured cell, and determines that any cell triggers an event 1C.

The event 1C indicates that a signal measurement value of a serving cell is lower than signal measurement values of the two candidate cells, and is further lower than a signal measurement value of a cell outside the active set.

S305: The terminal selects a candidate cell that has a largest signal measurement value as a specified cell, and sends a measurement report to the network and monitors the specified cell.

The measurement report indicates that the terminal requests to perform serving cell change. For example, the measurement report includes a request for enhanced serving cell change, cell information of the specified cell, capability information of supporting enhanced serving cell change, capability information of supporting preconfiguration a resource by the target cell, or an activation time offset used to calculate time for monitoring the specified cell.

S306: The network device determines a target cell according to the measurement report, and controls the target cell to send a change command to the terminal.

The network device determines, according to the measurement report, the candidate cell that has a largest signal measurement value or the specified cell in the measurement report as the target cell. That is, the target cell and the specified cell are a same candidate cell.

S307: The target cell sends the change command to the terminal.

S308: The terminal determines that time for monitoring the specified cell does not exceed a preset time, and receives the change command.

The preset time may be timed by the terminal by using a timer, and calculation of duration of the preset time may be implemented by adding an activation time offset to the measurement report by the terminal.

S309: The terminal performs serving cell change in the target cell according to the change command.

S310: The terminal sends a change completion message to the network device according to content in the list of preconfigured information.

Because the list of preconfigured information includes resource information of the target cell, after completing the serving cell change, the terminal may rapidly feed back the change completion message to the network device, which indicates that the serving cell change has been completed.

S311: The network device determines that the terminal completes the serving cell change, and informs the serving cell before the change that the terminal completes the serving cell change.

S312: The network device sends an active set update message to the terminal.

S313: The terminal deletes the serving cell from the active set according to the active set update message, and adds a cell outside the active set to the active set.

A signal measurement value of the cell that is added to the active set is greater than the signal measurement value of the serving cell.

Figure 4:
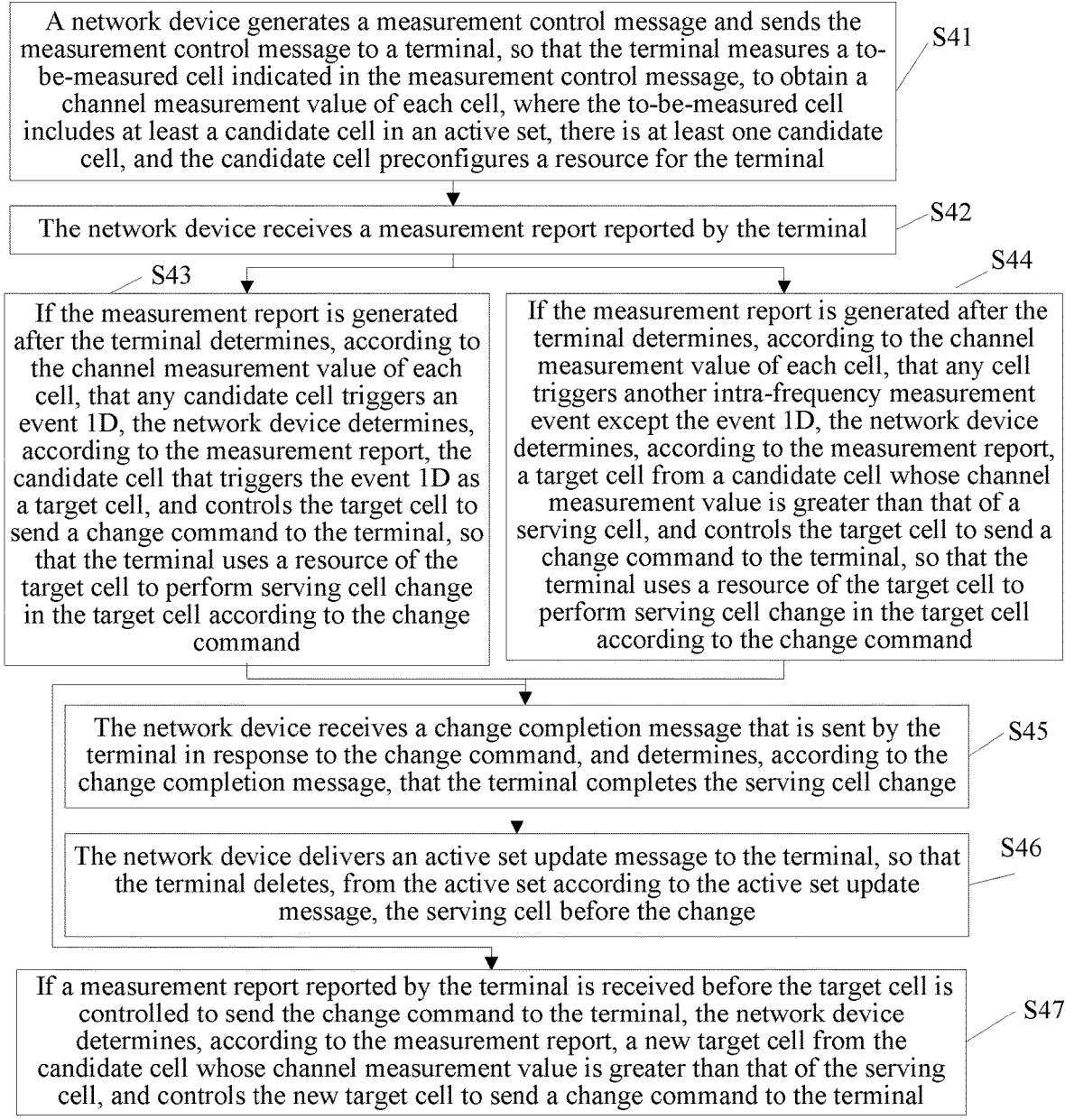
FIG. 4 is a schematic flowchart of a third embodiment of a cell change method according to the present disclosure.

FIG. 4 is a schematic flowchart of a third embodiment of a cell change method according to the present disclosure.

S41: A network device generates a measurement control message and sends the measurement control message to a terminal, so that the terminal measures a to-be-measured cell indicated in the measurement control message, to obtain a signal measurement value of each cell, where the to-be-measured cell includes a candidate cell in an active set, there is at least one candidate cell, and the candidate cell preconfigures a resource for the terminal.

The signal measurement value may be an RSCP value or an Ec/No value of pilot signal strength, or may be an accumulated value of an RSCP value or an Ec/No value of pilot signal strength and a CIO value. A pilot signal refers to a signal sent in a telecommunications network for a purpose of measurement and monitoring. A serving cell in the active set is a cell that provides an HS-DSCH service or an E-DCH service for the terminal, and a candidate cell is a cell that does not provide the HS-DSCH service or the E-DCH service for the terminal but establishes a link to the terminal, or a coordinated cell that provides the HS-DSCH service or the EDCH service for the terminal but serves as a serving cell. A cell outside the active set may be a cell in a set such as a monitoring set or a detection set.

S42: The network device receives a measurement report reported by the terminal.

S43: If the measurement report is generated after the terminal determines, according to the signal measurement value of each cell, that any candidate cell triggers an event 1D, the network device determines, according to the measurement report, the candidate cell that triggers the event 1D as a target cell, and controls the target cell to send a change command to the terminal, so that the terminal uses a resource of the target cell to perform serving cell change in the target cell according to the change command.

S44: If the measurement report is generated after the terminal determines, according to the signal measurement value of each cell, that any cell triggers another intra-frequency measurement event except the event 1D, the network device determines, according to the measurement report, a target cell from a candidate cell whose signal measurement value is greater than that of a serving cell, and controls the target cell to send a change command to the terminal, so that the terminal uses a resource of the target cell to perform serving cell change in the target cell according to the change command.

The terminal may determine, according to the signal measurement value of each cell, whether any cell triggers an event 1A, an event 1B, an event 1C, an event 1E, or an event 1F. If a result of the determining is yes, the terminal reports the measurement report to the network device. The network device needs to determine, according to content included in the measurement report, the target cell to which the serving cell is changed. In this embodiment, preferably, the serving cell triggers the event 1B, the event 1C, or the event 1F.

If the measurement report includes the signal measurement value of each cell, the network device needs to compare each signal measurement value, or if the measurement report does not include the signal measurement value of each cell, but includes only a comparison result of the signal measurement value of each cell, such as a descending order relationship of the signal measurement value of each cell, the network device does not need to compare each signal measurement value. In this case, the network device determines the target cell according to a preset rule that is the same as that of the terminal. The preset rule may require that the target cell is a candidate cell that has a largest signal measurement value among the candidate cell whose signal measurement value is greater than that of the serving cell, a candidate cell that has been in the active set for a longest time among the candidate cell whose signal measurement value is greater than that of the serving cell, or a candidate cell that is the first to join the active set among the candidate cell whose signal measurement value is greater than that of the serving cell.

If the measurement report includes cell information of only one candidate cell whose signal measurement value is greater than that of the serving cell, this candidate cell is a specified cell that is determined by the terminal according to the preset rule, and the network device directly determines this candidate cell as the target cell.

In this embodiment, while or before the network device receives the measurement report reported by the terminal, the cell change method further includes: receiving capability information reported by the terminal; determining, according to the capability information, whether the terminal supports enhanced serving cell change or preconfiguration of a resource by the target cell when any cell triggers the another intra-frequency measurement event except the event 1D; if it is determined that the terminal supports the enhanced serving cell change or the preconfiguration of a resource by the target cell, performing the step of determining, by the network device according to the measurement report, a target cell from a candidate cell whose signal measurement value is greater than that of a serving cell. That is, the network device may determine the target cell only after determining that the terminal can perform the enhanced serving cell change. In addition, the capability information, reported by the terminal, of supporting the serving cell change is further included in the measurement report.

In another embodiment, while or before the network device receives the measurement report reported by the terminal, the cell change method further includes: receiving capability information reported by the terminal; determining, according to the capability information, whether the terminal is a single receiver or a dual receiver and whether the terminal supports enhanced serving cell change or preconfiguration of a resource by the target cell when any cell triggers the another intra-frequency measurement event except the event 1D; if it is determined that the terminal is a single receiver and supports enhanced serving cell change or the preconfiguration of a resource by the target cell, performing the step of determining, by the network device according to the measurement report, a target cell from a candidate cell whose signal measurement value is greater than that of a serving cell.

S45: The network device receives a change completion message that is sent from the terminal in response to the change command, and determines, according to the change completion message, that the terminal completes the serving cell change.

S46: The network device delivers an active set update message to the terminal, so that the terminal deletes, from the active set according to the active set update message, the serving cell before the change.

If the original serving cell, that is, the serving cell before serving cell change is performed, triggers the event 1B or the event 1F, the active set update message is used to instruct the terminal to delete the original serving cell from the active set. If the primary serving cell triggers the event 1C, the active set update message is used to instruct the terminal to delete the original serving cell from the active set, and add, to the active set, a cell of the event 1C that is outside the active set and whose signal measurement value is greater than that of the primary serving cell.

S47: If a measurement report reported by the terminal is received before the target cell is controlled to send the change command to the terminal, the network device determines, according to the measurement report, a new target cell from the candidate cell whose signal measurement value is greater than that of the serving cell, and controls the new target cell to send a change command to the terminal.

The terminal may periodically perform intra-frequency measurement control, and therefore, it is possible that the measurement report reported by the terminal is received again before the target cell sends the change command, which indicates that any cell triggers any intra-frequency measurement event. The terminal may trigger serving cell change after successively reporting the event 1B and the event 1D, and triggers the event 1D after reporting the event 1B and before receiving the change command.

The network device determines, according to the measurement report, the new target cell from the candidate cell whose signal measurement value is greater than that of the serving cell. The determined new target cell may be the same as the target cell determined according to the previous measurement report.

In some other embodiments, the cell change method may include only S41, S42, S43, and S44, but does not include S45, S46, and S47.

In the cell change method provided in this embodiment of the present disclosure, a network device determines a target cell according to a measurement report reported by a terminal, and controls the target cell to send a change command to the terminal, where the measurement report is used to indicate that any cell triggers another intra-frequency measurement event except an event 1D, and a signal measurement value of the target cell is greater than a signal measurement value of a serving cell, thereby resolving a problem that a transmission success rate of the change command cannot be improved when the another intra-frequency measurement event except the event 1D is triggered. Because the target cell has preconfigured a wireless resource for the terminal, signaling overheads can be reduced, so that a serving cell change process can be rapidly performed.

Figure 5:
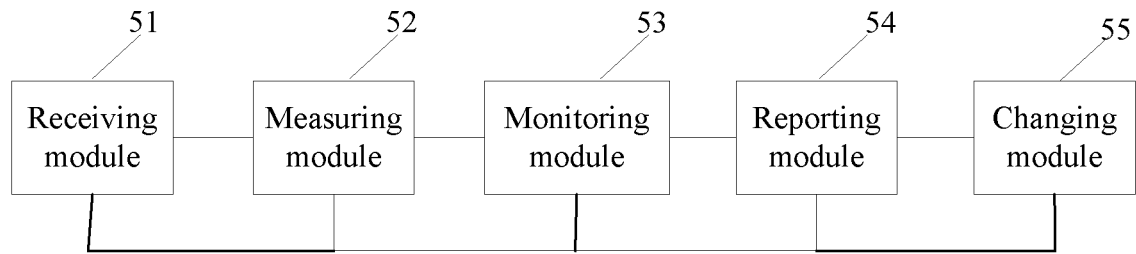
FIG. 5 is a schematic structural diagram of a first embodiment of a terminal according to the present disclosure.

FIG. 5 is a schematic structural diagram of a first embodiment of a terminal according to the present disclosure. The terminal includes a receiving module 51, a measuring module 52, a monitoring module 53, a reporting module 54, and a changing module 55. The receiving module 51, the measuring module 52, the monitoring module 53, the reporting module 54, and the changing module 55 may be connected to each other.

The receiving module 51 is configured to receive a measurement control message sent from a network device.

The measuring module 52 is configured to: measure a to-be-measured cell indicated in the measurement control message, to obtain a signal measurement value of each cell, and determine, according to the signal measurement value of each cell, whether any candidate cell triggers an event 1D or whether any cell triggers another intra-frequency measurement event except the event 1D, where the to-be-measured cell includes a candidate cell in an active set, there is at least one candidate cell, and the candidate cell preconfigures a resource for the terminal. The signal measurement value may be an RSCP value or an Ec/No value of pilot signal strength, or may be an accumulated value of an RSCP value or an Ec/No value of pilot signal strength and a CIO value. A pilot signal refers to a signal sent in a telecommunications network for a purpose of measurement and monitoring. The active set includes a serving cell and a candidate cell, where the serving cell is a cell that provides an HS-DSCH service or an E-DCH service for the terminal, and the candidate cell is a cell that does not provide the HS-DSCH service or the E-DCH service for the terminal, but establishes a link to the terminal, or a coordinated cell that provides the HS-DSCH service or the EDCH service for the terminal but serves as a serving cell. A cell outside the active set may be a cell in a set such as a monitoring set or a detection set. The resource preconfigured by the candidate cell includes at least a channel resource, an air interface resource, and the like.

The monitoring module 53 is configured to: when the measuring module 52 determines that any candidate cell triggers the event 1D, determine the candidate cell that triggers the event 1D as a target cell and monitor the target cell, and configured to: when the measuring module determines that any cell triggers the another intra-frequency measurement event except the event 1D, select, according to a preset rule, a specified cell from a candidate cell whose signal measurement value is greater than that of a serving cell, and monitor the specified cell. The another intra-frequency measurement event except the event 1D is a non-event 1D. Because the specified cell is selected from the candidate cell whose signal measurement value is greater than that of the serving cell, regardless of whether the serving cell or the candidate cell triggers the non-event 1D, it indicates that the signal measurement value of the serving cell is not the largest. For example, when the serving cell triggers an event 1B or an event 1F, it indicates that the signal measurement value of the serving cell is already lower than a threshold and this situation is kept for a period of time, and for example, the terminal is increasingly far from the serving cell. For example, a threshold T and time t are set in the active set, where the threshold T may be a signal measurement value of a candidate cell in the active set, or may be a preset signal measurement value. As long as the signal measurement value of the serving cell is lower than T and this situation is kept for time μl, a trigger condition for the event 1B or the event 1F is met, and a value of t is generally 640 ms. If a candidate cell triggers the event 1B or 1F, it indicates that the signal measurement value of the serving cell is greater than that of this candidate cell, but is still lower than those of some other candidate cells. If the serving cell triggers an event 1C, it indicates that the serving cell is a cell that has a smallest signal measurement value in the active set, and a signal measurement value of a cell outside the active set is greater than the signal measurement value of the serving cell, and this situation is kept for a period of time, and a value of this time is 320 ms. If a candidate cell triggers the event 1C, it indicates that this candidate cell is a cell that has a smallest signal measurement value in the active set, but the serving cell in this case is not a cell that has a largest signal measurement value in the active set. In addition, when a candidate cell in the active set or a cell outside the active set triggers an event 1E, a situation in which the signal measurement value of the candidate cell is greater than that of the serving cell may also exist.

The reporting module 54 is configured to report a measurement report to the network device when the measuring module 52 determines that any candidate cell triggers the event 1D, so that the network device determines, according to the measurement report, the candidate cell that triggers the event 1D as the target cell, and controls the target cell to send a change command to the terminal, and configured to report a measurement report to the network device when the measuring module determines that any cell triggers the another intra-frequency measurement event except the event 1D, so that the network device determines, according to the measurement report, the target cell from the candidate cell whose signal measurement value is greater than that of the serving cell, and controls the target cell to send a change command to the terminal. In this embodiment, the target cell is a candidate cell with best communication quality. The measurement report may include the signal measurement value of each cell, and then, the network device needs to compare each signal measurement value, or the measurement report does not include the signal measurement value of each cell but includes only a comparison result of the signal measurement value of each cell, such as a descending order relationship of the signal measurement value of each cell, and then, the network device does not need to compare each signal measurement value.

In this embodiment, there may be one specified cell or multiple specified cells that are determined by the monitoring module 53. If there is one specified cell, the target cell and the specified cell are a same candidate cell. If there are multiple specified cells, the target cell is one of the specified cells.

The receiving module 51 is further configured to receive the change command from the target cell.

The changing module 55 is configured to use a resource of the target cell to perform serving cell change in the target cell according to the change command, where there is one specified cell or multiple specified cells, and the target cell is the specified cell or one of the specified cells. Because the target cell is a monitored cell, a cell monitored by the monitoring module 53 certainly includes the target cell, so that the changing module 55 may receive the change command from the target cell. After the reporting module 54 reports the measurement report, the changing module 55 cannot immediately receive the change command, but the monitoring module 53 needs to monitor the target cell to wait for the target cell to send the change command. In this embodiment, the change command is sent at a physical layer. For example, the change command is an HS-SCCH Order. When the changing module 55 performs serving cell change, because the target cell has preconfigured the resource for the terminal, the changing module 55 does not need to request the target cell to send information about the configured resource, and only needs to receive the change command and rapidly complete the serving cell change, which reduces signaling overheads.

In the terminal provided in this embodiment, a candidate cell in an active set preconfigures a resource for the terminal. If any cell triggers another intra-frequency measurement event except an event 1D, the terminal determines a specified cell from a candidate cell whose signal measurement value is greater than that of a serving cell, and monitors the specified cell. A network device determines a target cell from the candidate cell whose signal measurement value is greater than that of the serving cell, and controls the target cell to send a change command. The target cell is the specified cell or one of specified cells, a signal measurement value of the specified cell is greater than the signal measurement value of the serving cell, and the target cell has preconfigured a resource for the terminal, so that a problem that a transmission success rate of the change command cannot be improved when the another intra-frequency measurement event except the event 1D is triggered can be resolved, and signaling overheads can be reduced, and a serving cell change process can be rapidly performed.

Figure 6:
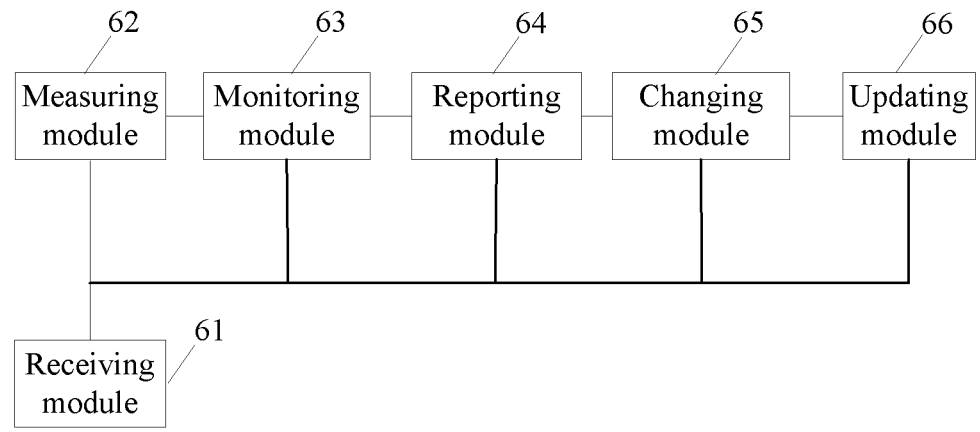
FIG. 6 is a schematic structural diagram of a second embodiment of a terminal according to the present disclosure.

FIG. 6 is a schematic structural diagram of a second embodiment of a terminal according to the present disclosure. The terminal includes a receiving module 61, a measuring module 62, a monitoring module 63, a reporting module 64, a changing module 65, and an updating module 66. The receiving module 61, the measuring module 62, the monitoring module 63, the reporting module 64, the changing module 65, and the updating 66 may be connected to each other.

The receiving module 61 is configured to receive a measurement control message sent from a network device.

The measuring module 62 is configured to: measure a to-be-measured indicated in the measurement control message, to obtain a signal measurement value of each cell, and determine, according to the signal measurement value of each cell, whether any candidate cell triggers an event 1D or whether any cell triggers another intra-frequency measurement event except the event 1D, where the to-be-measured cell includes a candidate cell in an active set, there is at least one candidate cell, and the candidate cell preconfigures a resource for the terminal.

The monitoring module 63 is configured to: when the measuring module 62 determines that any candidate cell triggers the event 1D, determine the candidate cell that triggers the event 1D as a target cell, and monitor the target cell, and configured to: when the measuring module determines that any cell triggers the another intra-frequency measurement event except the event 1D, select, according to a preset rule, a specified cell from a candidate cell whose signal measurement value is greater than that of a serving cell, and monitor the specified cell.

The reporting module 64 is configured to report a measurement report to the network device when the measuring module 62 determines that any candidate cell triggers the event 1D, so that the network device determines, according to the measurement report, the candidate cell that triggers the event 1D as the target cell, and controls the target cell to send a change command to the terminal, and configured to report a measurement report to the network device when the measuring module 62 determines that any cell triggers the another intra-frequency measurement event except the event 1D, so that the network device determines, according to the measurement report, a target cell from the candidate cell whose signal measurement value is greater than that of the serving cell, and controls the target cell to send a change command to the terminal. The reporting module 64 is further configured to: report capability information to the network device while or before reporting the measurement report to the network device, so that the network device determines, according to the capability information, whether the terminal supports serving cell change or preconfiguration of a resource by the target cell when any cell triggers the another intra-frequency measurement event except the event 1D.

The changing module 65 is configured to: receive the change command from the target cell, and use a resource of the target cell to perform serving cell change according to the change command, where there is one specified cell or multiple specified cells, and the target cell is the specified cell or one of the specified cells. The changing module 65 is further configured to send a change completion message in response to the change command after completing the serving cell change, so that the network device determines, according to the change completion message, that the terminal completes the serving cell change.

The receiving module 61 is further configured to receive an active set update message from the network device.

The updating module 66 is configured to delete, from the active set according to the active set update message, the serving cell before the change. If the original serving cell, that is, the serving cell before the serving cell change is performed, triggers an event 1B, the active set update message is used to instruct the updating module 66 to delete the original serving cell from the active set. If the original serving cell triggers an event 1C, the active set update message is used to instruct the updating module 66 to delete the original serving cell from the active set, and add, to the active set, a cell that is outside the active set and whose signal measurement value is greater than that of the original serving cell. If the cell outside the active set triggers an event 1E, and a capacity of the active set does not reach an upper limit, the updating module 66 may add this cell to the active set according to the active set update message. If the capacity of the active set has reached the upper limit, the updating module 66 may delete, according to the active set update message, the candidate cell that has a smallest signal measurement value in the active set, and add this cell outside the active set.

There are multiple implementation manners of determining the target cell by the network device. Some examples are described in detail by reference to the following situations:

In a first situation, there is one specified cell. In this case, the measurement report includes cell information of the specified cell, so that the network device determines the specified cell as the target cell according to the cell information of the specified cell. That is, when the monitoring module 63 determines the specified cell, the network device does not know which candidate cell is determined as the specified cell by the monitoring module 63, and therefore the reporting module 64 needs to report, in the measurement report, the cell information of the specified cell to the network device. The cell information may be a scrambling code or a cell identifier of the specified cell.

In a second situation, there is one specified cell. In this case, the measurement report includes the signal measurement value of each cell, so that the network device determines, according to the preset rule, the target cell from the candidate cell whose signal measurement value is greater than that of the serving cell. Because the measuring module 62 obtains a signal measurement value of each cell, the measuring module 62 can know which candidate cell has greater signal measurement value than that of the serving cell, so that the monitoring module 63 may determine the specified cell according to the preset rule.

In a third situation, there are at least two specified cells. In this case, the measurement report also includes a signal measurement value of each specified cell, so that the network device determines the target cell from the at least two specified cells. The target cell determined by the network device may be any one of the specified cells. Because signal measurement values of the specified cells are greater than the signal measurement value of the serving cell, a signal measurement value of the target cell is greater than the signal measurement value of the serving cell. Because the target cell is one of the specified cells, the monitoring module 63 must monitor all specified cells, and the monitoring module 63 may also monitor the target cell.

In the foregoing second and third situations, the measurement report may also include a comparison result of the signal measurement value. For example, in the second situation, the measurement report includes only the comparison result of the signal measurement value of each cell, but does not carry the signal measurement value of each cell. For example, the comparison result is a descending order relationship of all cells according to the signal measurement value, and then, the network device can directly know, from the comparison result, which candidate cell has a greater signal measurement value than that of the serving cell, and which candidate cell has a largest signal measurement value.

In the foregoing three situations, the preset rule may require that the specified cell is a candidate cell that has a largest signal measurement value among the candidate cell whose signal measurement value is greater than that of the serving cell, a candidate cell that has been in the active set for a longest time among the candidate cell whose signal measurement value is greater than that of the serving cell, or a candidate cell that is the first to join the active set among the candidate cell whose signal measurement value is greater than that of the serving cell. If there are at least two cells in the active set that have a same largest signal measurement value, the preset rule may require that the specified cell is determined according to a cell sequence in the measurement report. For example, it is stipulated that the Nth candidate cell that has a largest signal measurement value in a measurement result list is the specified cell, where 1≤N≤m, m is a quantity of cells in the active set. Preferably, the specified cell may be a first candidate cell that has a largest signal measurement value, and a measurement result of this candidate cell is the first one or last one listed in the measurement result list. Regardless of how the preset rule changes, the signal measurement value of the specified cell must be greater than the signal measurement value of the serving cell. Because the measurement report includes the signal measurement value of each cell, the network device may determine the target cell according to a preset rule that is the same as that of the monitoring module 63.

Based on the foregoing three situations, the measurement further includes a change request, and the change request is used to enable the network device to determine whether to control the target cell to send the change command to the terminal.

In this embodiment, when the measuring module 62 determines that any cell triggers the another intra-frequency measurement event except the event 1D, the reporting module 64 is further configured to construct a trigger identifier of the event 1D in the measurement report, so that the network device determines, according to the trigger identifier, that the specified cell triggers the event 1D.

In this embodiment, the changing module 65 is configured to: determine whether the change command is received within a preset time, and when determining that the change command is received within the preset time, use the resource of the target cell to perform serving cell change in the target cell according to the change command. The monitoring module 63 is further configured to stop monitoring the specified cell when the changing module 65 determines that the change command is not received within the preset time.

The reporting module 64 may further carry an activation time offset when reporting the measurement report, and the preset time is a current CFN when reporting the measurement report plus the activation time offset. In wireless communication, especially in an air interface synchronization configuration instruction, the network device generally needs to add the activation time offset to signaling, and the activation time offset specifies a frame number that causes changed configuration of the terminal to take effect. Herein, the activation time offset indicates duration in which the monitoring module 63 monitors the specified cell. If the measurement report does not carry the activation time offset, the monitoring module 63 may determine, by timing with a timer, whether the preset time is exceeded.

Further, if the measuring module 62 determines, within the preset time, that any cell triggers an intra-frequency measurement event, the reporting module 64 is further configured to report a measurement report to the network device. Further, if the target cell determined by the network device according to the measurement report is a candidate cell that has a largest signal measurement value in the active set, and the candidate cell that has a largest signal measurement value changes when the reporting module 64 reports the measurement report to the network device, the network device may redetermine the target cell.

Figure 7:
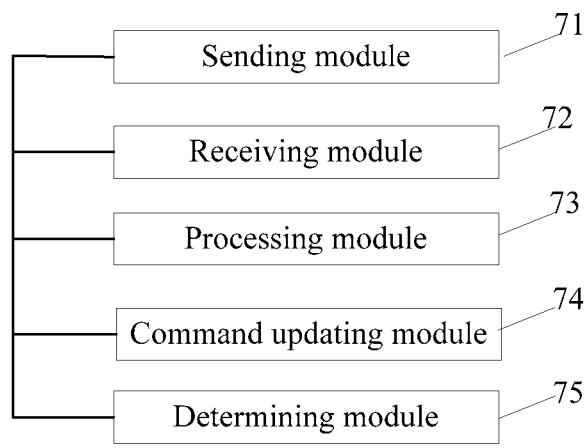
FIG. 7 is a schematic structural diagram of a first embodiment of a network device according to the present disclosure.

FIG. 7 is a schematic structural diagram of a first embodiment of a network device according to the present disclosure. The network device includes a sending module 71, a receiving module 72, a processing module 73, a command updating module 74, and a determining module 75, and the sending module 71, the receiving module 72, the processing module 73, the command updating module 74, and the determining module 75 may be connected to each other. In this embodiment, the network device is a radio network controller (RNC).

The sending module 71 is configured to send a measurement control message to a terminal, so that the terminal measures a to-be-measured cell indicated in the measurement control message, to obtain a signal measurement value of each cell, where the to-be-measured cell includes a candidate cell in an active set, there is at least one candidate cell, and the candidate cell preconfigures a resource for the terminal.

The receiving module 72 is configured to receive a measurement report reported by the terminal and capability information reported by the terminal, where the measurement report is generated after the terminal determines, according to the signal measurement value of each cell, that any candidate cell triggers an event 1D or determines that any cell triggers another intra-frequency measurement event except the event 1D. The signal measurement value may be an RSCP value or an Ec/No value of pilot signal strength, or may be an accumulated value of an RSCP value or an Ec/No value of pilot signal strength and a CIO value. A pilot signal refers to a signal sent in a telecommunications network for a purpose of measurement or monitoring. The active set includes a serving cell and a candidate cell, where the serving cell is a cell that provides an HS-DSCH service or an E-DCH service for the terminal, and the candidate cell is a cell that does not provide the HS-DSCH service or the E-DCH service for the terminal but establishes a link to the terminal, or a coordinated cell that provides the HS-DSCH service or the EDCH service for the terminal but serves as a serving cell. A cell outside the active set may be a cell in a set such as a monitoring set or a detection set. In another embodiment, the receiving module 72 may receive, before receiving the measurement report reported by the terminal, the capability information reported by the terminal.

The determining module 75 is configured to determine, according to the capability information, whether the terminal supports serving cell change or preconfiguration of a resource by a target cell, that is, enhanced serving cell change, when any cell triggers the another intra-frequency measurement event except the event 1D.

The processing module 73 is configured to: when the measurement report is generated after the terminal determines, according to the signal measurement value of each cell, that any candidate cell triggers the event 1D, determine, according to the measurement report, the candidate cell that triggers the event 1D as a target cell, and control the target cell to send a change command to the terminal, so that the terminal uses a resource of the target cell to perform serving cell change in the target cell according to the change command, and configured to: when the measurement report is generated after the terminal determines, according to the signal measurement value of each cell, that any cell triggers the another intra-frequency measurement event except the event 1D and the determining module 75 determines that the terminal supports serving cell change or the preconfiguration of a resource by the target cell, determine, according to the measurement report, a target cell from a candidate cell whose signal measurement value is greater than that of the serving cell, and control the target cell to send a change command to the terminal, so that the terminal uses a resource of the target cell to perform serving cell change in the target cell according to the change command. The processing module 73 needs to determine the target cell according to content included in the measurement report. If the measurement report includes the signal measurement value of each cell, the processing module 73 needs to compare the signal measurement value of each cell to obtain a comparison result, and then determine the target cell according to a preset rule; if the measurement report includes cell information of only one candidate cell, the processing module 73 directly determines this candidate cell as the target cell. In this embodiment, the target cell is a candidate cell that has a largest signal measurement value.

The receiving module 72 is further configured to: receive a change completion message that is sent from the terminal in response to the change command. The processing module 73 is further configured to determine, according to the change completion message, that the terminal completes the serving cell change.

The command updating module 74 is configured to generate an active set update message after the processing module 73 determines that the terminal completes the serving cell change. The sending module is configured to deliver the active set update message to the terminal, so that the terminal deletes, from the active set according to the active set update message, the serving cell before the change.

In this embodiment, if before the processing module 73 controls the target cell to send the change command to the terminal, the receiving module 72 receives the measurement report reported by the terminal, the processing module 73 is further configured to: receive a measurement report again from the receiving module 72, determine, according to the measurement report, a new target cell from the candidate cell whose signal measurement value is greater than that of the serving cell, and control the new target cell to send a change command to the terminal.

In some other embodiments, the network device includes only a sending module 71, a receiving module 72, and a processing module 73, where the sending module 71 is configured to send a measurement control message to a terminal, so that the terminal measures a to-be-measured cell indicated in the measurement control message, to obtain a signal measurement value of each cell, where the to-be-measured cell includes a candidate cell in an active set, there is at least one candidate cell, and the candidate cell preconfigures a resource for the terminal; the receiving module 72 is configured to receive a measurement report reported by the terminal; the processing module 73 is configured to: when the measurement report is generated after the terminal determines, according to the signal measurement value of each cell, that any candidate cell triggers an event 1D, determine, according to the measurement report, the candidate cell that triggers the event 1D as a target cell, and control the target cell to send a change command to the terminal, so that the terminal uses a resource of the target cell to perform serving cell change in the target cell according to the change command; and configured to: when the measurement report is generated after the terminal determines, according to the signal measurement value of each cell, that any cell triggers another intra-frequency measurement event except the event 1D, determine, according to the measurement report, a target cell from a candidate cell whose signal measurement value is greater than that of a serving cell, and control the target cell to send a change command to the terminal, so that the terminal uses a resource of the target cell to perform serving cell change in the target cell according to the change command.

Figure 8:
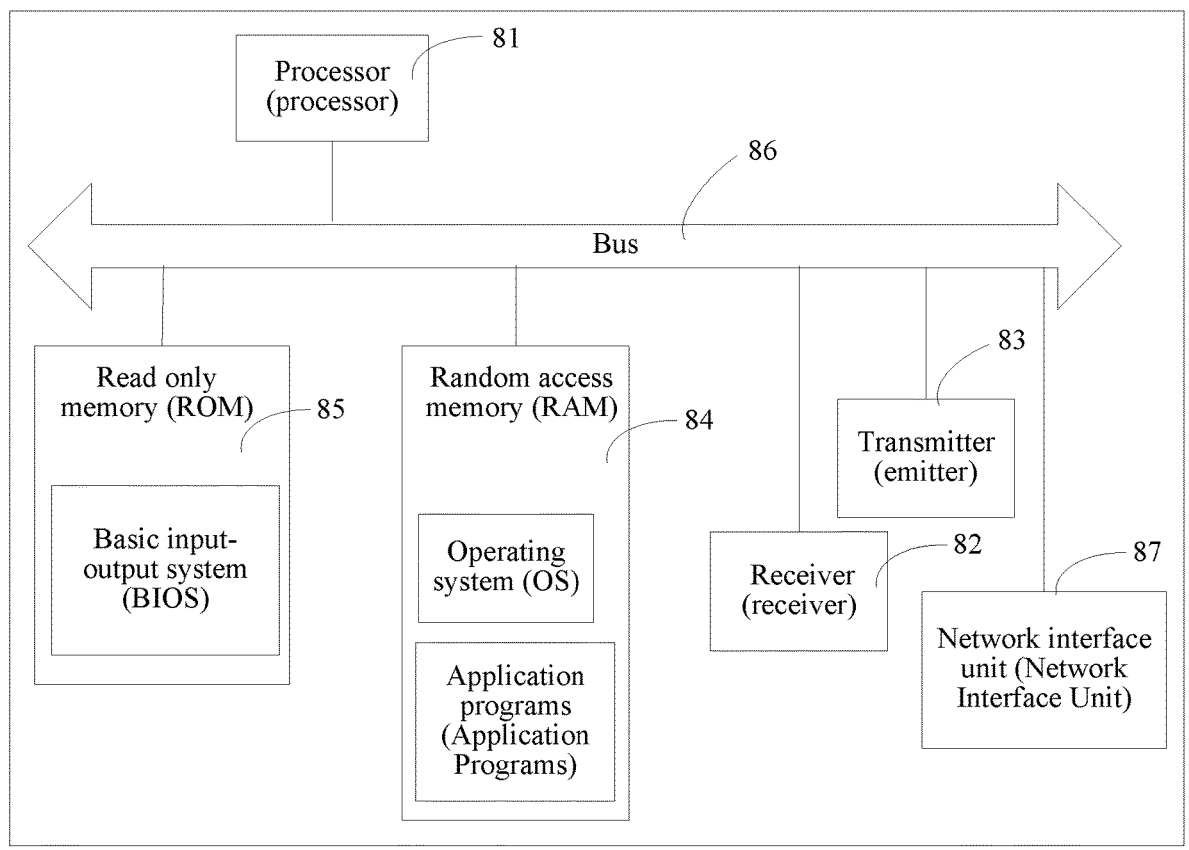
FIG. 8 is a schematic structural diagram of a third embodiment of a terminal according to the present disclosure.

FIG. 8 is a schematic structural diagram of a third embodiment of a terminal according to the present disclosure.

The terminal includes a processor 81, a receiver 82, a transmitter 83, a random access memory (RAM) 84, a read only memory (ROM) 85, a bus 86, and a network interface unit 87. The processor 81 is separately coupled to the receiver 82, the transmitter 83, the RAM 84, the ROM 85, and the network interface unit 87 by using the bus 86. When it is required to run the terminal, the terminal is started by using a basic input-output system (BIOS) that is permanently stored in the ROM 85 or a boot loader guiding system in an embedded system, and the terminal is guided to enter a normal working state. After the terminal enters a normal working state, application programs and an operating system (OS) run in the RAM 84.

The receiver 82 is configured to receive a measurement control message sent from a network device.

The processor 81 is configured to: measure a to-be-measured indicated in the measurement control message, to obtain a signal measurement value of each cell, and determine, according to the signal measurement value of each cell, whether any candidate cell triggers an event 1D or any cell triggers another intra-frequency measurement event except the event 1D, where the to-be-measured cell includes a candidate cell in an active set, there is at least one candidate cell, and the candidate cell preconfigures a resource for the terminal.

The processor 81 is further configured to: when it is determined that any candidate cell triggers the event 1D, determine a candidate cell that triggers the event 1D as a target cell and monitor the target cell, and configured to: when it is determined that any cell triggers the another intra-frequency measurement event except the event 1D, select, according to a preset rule, a specified cell from a candidate cell whose signal measurement value is greater than that of a serving cell, and monitor the specified cell. In this embodiment, the preset rule requires that the specified cell is a candidate cell that has a largest signal measurement value or a candidate cell that has been in the active set for a longest time. If there are at least two cells in the active set that have a same largest signal measurement value, the preset rule may require that the specified cell is determined by a cell sequence in a measurement report. For example, it is stipulated that the Nth candidate cell that has a largest signal measurement value in a measurement result list is the specified cell, where 1≤N≤m is a quantity of cells in the active set. Preferably, the specified cell may be a first candidate cell that has a largest signal measurement value, and a measurement result of this candidate cell is the first one or last one listed in the measurement result list.

The transmitter 83 is configured to report a measurement report to the network device when the processor 81 determines that any candidate cell triggers the event 1D, so that the network device determines, according to the measurement report, the candidate cell that triggers the 1D event as the target cell, and controls the target cell to send a change command to the terminal, and configured to: report a measurement report to the network device when the processor 81 determines that any cell triggers the another intra-frequency measurement event except the event 1D, so that the network device determines, according to the measurement report, a target cell from the candidate cell whose signal measurement value is greater than that of the serving cell and controls the target cell to send a change command to the terminal.

The receiver 82 is configured to receive the change command from the target cell.

The processor 81 is further configured to use a resource of the target cell to perform serving cell change in the target cell according to the change command. The processor 81 is configured to: determine whether the change command is received within a preset time, and when determining that the change command is received within the preset time, use the resource of the target cell to perform serving cell change in the target cell according to the change command. The processor 81 is further configured to stop monitoring the specified cell when the receiver 82 does not receive the change command within the preset time. Further, if before the processor 82 receives the change command, the processor 81 determines, within the preset time, that any cell triggers an intra-frequency measurement event, the transmitter 83 is further configured to report a measurement report to the network device.

In this embodiment, there is one specified cell. The measurement report includes cell information of the specified cell, so that the network device determines the specified cell as the target cell according to the cell information of the specified cell, or the measurement report includes the signal measurement value of each cell, so that the network device determines, according to the preset rule, the target cell from the candidate cell whose signal measurement value is greater than that of the serving cell. In another embodiment, there are at least two specified cells, and the measurement report includes signal measurement values of the at least two specified cells, so that the network device determines the target cell from the at least two specified cells. In addition, the measurement report may further include a change request, so that the network device determines, according to the change request, whether to control the target cell to send the change command to the terminal.

In this embodiment, the transmitter 83 is further configured to: when the processor 81 determines that any cell triggers the another intra-frequency measurement event except the event 1D, construct a trigger identifier of the event 1D in the measurement report, so that the network device determines, according to the trigger identifier, that the specified cell triggers the event 1D. The transmitter 83 is further configured to: while or before reporting the measurement report to the network device, report capability information to the network device, so that the network device determines, according to the capability information, whether the terminal supports serving cell change or preconfiguration of a resource by the target cell when any cell triggers the another intra-frequency measurement event except the event 1D.

As an extension of this embodiment, the receiver 82 is further configured to receive an active set update message from the network device. The processor 81 is further configured to delete, from the active set according to the active set update message, the serving cell before the change.

For implementation processes of the processor 81, the receiver 82, and the transmitter 83, refer to the cell change method and the terminal in the foregoing embodiments, and details are not described herein again.

Figure 9:
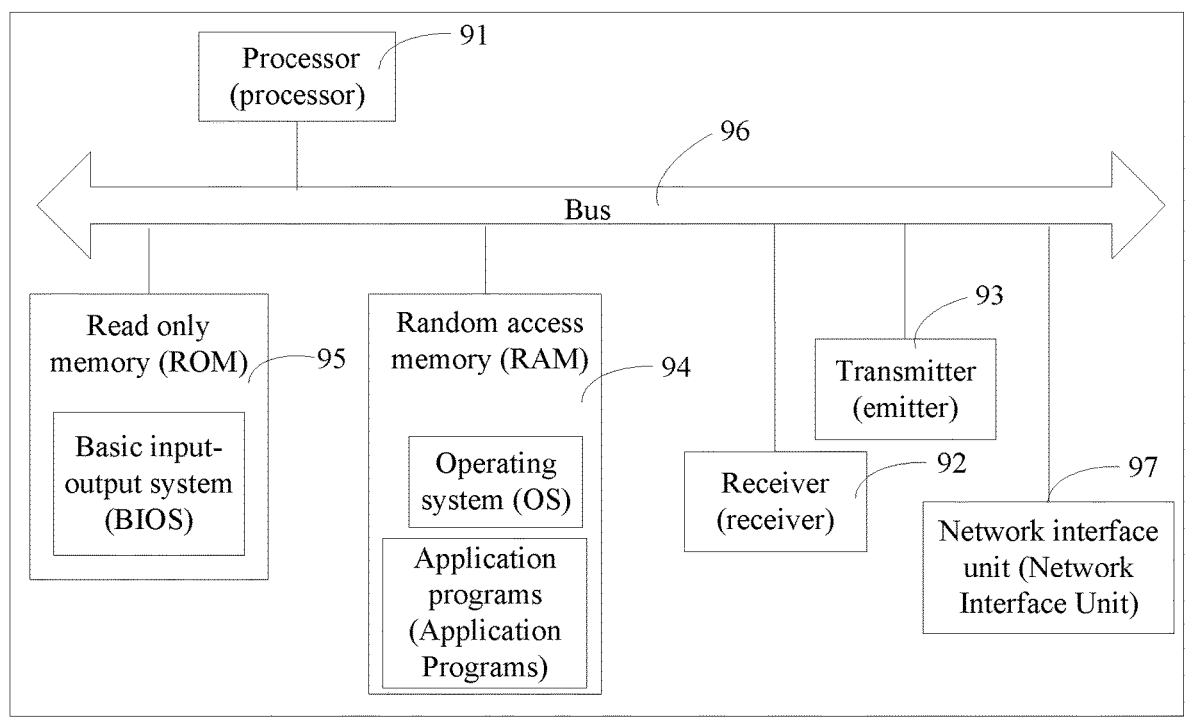
FIG. 9 is a schematic structural diagram of a second embodiment of a network device according to the present disclosure.

FIG. 9 is a schematic structural diagram of a second embodiment of a network device according to the present disclosure.

The network device includes a processor 91, a receiver 92, a transmitter 93, a RAM 94, a ROM 95, a bus 96, and a network interface unit 97. The processor 91 is separately coupled to the receiver 92, the transmitter 93, the RAM 94, the ROM 95, and the network interface unit 97 by using the bus 96. When it is required to run the network device, the network device is started by using a BIOS that is permanently stored in the ROM 95 or a boot loader guiding system in an embedded system, and the network device is guided to enter a normal working state. After the network device enters the normal working state, application programs and an OS run in the RAM 94.

The processor 91 generates a measurement control message.

The transmitter 93 is configured to send the measurement control message to a terminal, so that the terminal measures a to-be-measured cell indicated in the measurement control message, to obtain a signal measurement value of each cell, where the to-be-measured cell includes a candidate cell in an active set, there is at least one candidate cell, and the candidate cell preconfigures a resource for the terminal.

The receiver 92 is configured to receive a measurement report reported by the terminal.

If the measurement report is generated after the terminal determines, according to the signal measurement value of each cell, that any candidate cell triggers an event 1D, the processor 91 is configured to: determine, according to the measurement report, the candidate cell that triggers the event 1D as a target cell, and control the target cell to send a change command to the terminal, so that the terminal uses a resource of the target cell to perform serving cell change in the target cell according to the change command; if the measurement report is generated after the terminal determines, according to the signal measurement value of each cell, that any cell triggers another intra-frequency measurement event except the event 1D, the processor 91 is configured to: determine, according to the measurement report, a target cell from a candidate cell whose signal measurement value is greater than that of a serving cell, and control the target cell to send a change command to the terminal, so that the terminal uses a resource of the target cell to perform serving cell change in the target cell according to the change command.

In this embodiment, the receiver 92 is further configured to receive capability information reported by the terminal. The processor 91 is further configured to determine, according to the capability information, whether the terminal supports serving cell change or preconfiguration of a resource by the target cell when any cell triggers the another intra-frequency measurement event except the event 1D; and further configured to: when it is determined that the terminal supports serving cell change or the preconfiguration of a resource by the target cell, determine, according to the measurement report, the target cell from the candidate cell whose signal measurement value is greater than that of the serving cell.

In this embodiment, if the receiver 92 receives, before the processor 91 controls the target cell to send the change command to the terminal, the measurement report reported by the terminal, the processor 91 is further configured to: receive a measurement report again from the receiver 92, and determine, according to the measurement report, a new target cell from the candidate cell whose signal measurement value is greater than that of the serving cell, and control the new target cell to send a change command to the terminal.

As an extension of this embodiment, the processor 91 is further configured to generate an active set update message. The transmitter 93 is further configured to delete, from the active set according to the active set update message, the serving cell before the change.

For implementation processes of the processor 91, the receiver 92, and the transmitter 93, refer to the cell change method and the network device in the foregoing embodiments, and details are not described herein again.

In the several embodiments provided in the present application, it should be understood that the disclosed system, apparatus, and method may be implemented in other manners. For example, the described apparatus embodiment is merely exemplary. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present application essentially, or the part contributing to the prior art, or all or a part of the technical solutions may be implemented in the form of a software product. The software product is stored in a storage medium and includes several instructions for instructing a computer device (which may be a personal computer, a management server, or a network device) or a processor to perform all or a part of the steps of the methods described in the embodiments of the present application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely embodiments of the present disclosure, and the protection scope of the present application is not limited thereto. All equivalent structure or process changes made according to the content of this specification and accompanying drawings in the present application or by directly or indirectly applying the present disclosure in other related technical fields shall fall within the protection scope of the present application.

What is claimed is:

1. A cell change method comprising:
 receiving, by a terminal, a measurement control message for at least one candidate cell from a network device;
 measuring, by the terminal, a signal measurement value of each candidate cell of the at least one candidate cell for handing over communications between the terminal and a network from a serving cell to a target cell, wherein the signal measurement value is related to a pilot signal;
 determining, by the terminal and according to the signal measurement value of each of the candidate cells, whether a candidate cell of the at least one candidate cell triggers an intra-frequency measurement event that a pilot signal strength of the candidate cell is greater than that of the serving cell;

in response to the terminal determining that a candidate cell of the at least one candidate cell triggers a first intra-frequency measurement event indicating that a pilot signal strength of a cell is greater than that of a current serving cell, implementing the following at the terminal:
  (a) determining the candidate cell of the at least one candidate cell that triggers the first intra-frequency measurement event as a target cell; and
  (b) reporting a first measurement report of the target cell to the network device for determining, according to the first measurement report, the candidate cell that triggers the first intra-frequency measurement event as the target cell; and in response to the terminal determining that the candidate cell of the at least one candidate cell triggers a second intra-frequency measurement event that is not the first intra-frequency measurement event, implementing the following at the terminal:
  (c) selecting, according to a preset rule, a cell from at least one candidate cell whose signal measurement value is greater than that of the serving cell as the target cell; and
  (d) reporting a second measurement report of the selected cell to the network device for determining, according to the second measurement report, the target cell from the at least one candidate cell whose signal measurement value is greater than that of the serving cell;

receiving, by the terminal, a change command from the target cell to initiate handing over network communications from the serving cell to the target cell;

performing, by the terminal, a serving cell change in the target cell according to the change command;

receiving, by the terminal, an update message from the network device; and deleting, by the terminal, the serving cell from the at least one candidate cell according to the update message.

2. The cell change method according to claim 1, wherein the second measurement report comprises cell information of the determined candidate cell, which enables the network device to determine the determined candidate cell to be the target cell according to the cell information.

3. The cell change method according to claim 1, wherein at least two of the at least one candidate cell are determined according to the preset rule, and the second measurement report comprises signal measurement values of the at least two determined candidate cells, which enables the network device to determine the target cell from the at least two determined candidate cells.

4. The cell change method according to claim 1, wherein the second measurement report further comprises a change request, which enables the network device to determine, according to the change request, whether to control the target cell to send the change command to the terminal.

5. The cell change method according to claim 1, wherein the preset rule comprises a requirement that the determined at least one candidate cell is the candidate cell with a largest signal measurement value.

6. The cell change method according to claim 1, wherein when there are at least two of the at least one candidate cells with the largest signal measurement value, the preset rule comprises a requirement that the determined at least one candidate cell is a candidate cell that is listed in a preset location of the second measurement report and has the largest signal measurement value.

7. The cell change method according to claim 1, wherein the preset rule comprises a requirement that the determined at least one candidate cell is a candidate cell that is the first one or last one listed in the second measurement report and has a largest signal measurement value.

8. The cell change method according to claim 1, wherein during or before reporting the second measurement report to the network device, the method further comprises:
  reporting, by the terminal, capability information to the network device for determining, according to the capability information, whether the terminal supports the serving cell change or preconfiguration of a resource by the target cell when any cell triggers the another intra-frequency measurement event except the first event.

9. An apparatus comprising:
  at least one processor and a non-transitory computer readable storage medium, wherein the non-transitory computer readable storage medium comprises a program which, when executed by the at least one processor, causes the at least one processor configured to:
  receive a measurement control message for at least one candidate cell from a network device;
  measure a signal measurement value of each candidate cell of the at least one candidate cell for handing over communications between the terminal and a network from a serving cell to a target cell, wherein the signal measurement value is related to a pilot signal;
  determine, according to the signal measurement value of each of the candidate cells, whether a candidate cell of the at least one candidate cell triggers an intra-frequency measurement event that a pilot signal strength of the candidate cell is greater than that of the serving cell;
  in response to determining that a candidate cell of the at least one candidate cell triggers a first intra-frequency measurement event indicating that a pilot signal strength of a cell is greater than that of a current serving cell, implement the following:
    (a) determine the candidate cell of the at least one candidate cell that triggers the first intra-frequency measurement event as a target cell; and
    (b) report a first measurement report of the target cell to the network device for determining, according to the first measurement report, the candidate cell that triggers the first intra-frequency measurement event as the target cell; and
  in response to determining that the candidate cell of the at least one candidate cell triggers a second intra-frequency measurement event that is not the first intra-frequency measurement event, implement the following:
    (c) select, according to a preset rule, a cell from at least one candidate cell whose signal measurement value is greater than that of the serving cell as the target cell; and
    (d) report a second measurement report of the selected cell to the network device for determining, according to the second measurement report, the target cell from the at least one candidate cell whose signal measurement value is greater than that of the serving cell;
  receive a change command from the target cell to initiate handing over network communications from the serving cell to the target cell;

perform a serving cell change in the target cell according to the change command;
receiving an update message from the network device; and
deleting the serving cell from the at least one candidate cell according to the update message.

10. The apparatus according to claim 9, wherein the second measurement report comprises cell information of the determined candidate cell, which enables the network device to determine the determined candidate cell to be the target cell according to the cell information.

11. The apparatus according to claim 9, wherein at least two of the at least one candidate cell are determined according to the preset rule, and the second measurement report comprises signal measurement values of the at least two determined candidate cells, which enable the network device to determine the target cell from the at least two determined candidate cells.

12. The apparatus according to claim 9, wherein the second measurement report further comprises a change request, which enables the network device to determine, according to the change request, whether to control the target cell to send the change command to the terminal.

13. The apparatus according to claim 9, wherein the preset rule comprises a requirement that the determined at least one candidate cell is the candidate cell with a largest signal measurement value.

14. The apparatus according to claim 9, wherein when there are at least two of the at least one candidate cells with the largest signal measurement value, the preset rule comprises a requirement that the determined at least one candidate cell is a candidate cell that is listed in a preset location of the second measurement report and has the largest signal measurement value.

15. The apparatus according to claim 9, wherein the preset rule comprises a requirement that the determined at least one candidate cell is a candidate cell that is the first one or last one listed in the second measurement report and has a largest signal measurement value.

16. The apparatus according to claim 9, wherein the at least one processor is further configured to, during or before reporting the second measurement report to the network device, report capability information to the network device for determining, according to the capability information, whether the terminal supports the serving cell change or preconfiguration of a resource by the target cell when any cell triggers the another intra-frequency measurement event except the first event.

17. An apparatus comprising:
a processor;
a receiver configured to cooperate with the processor to receive a measurement control message for at least one candidate cell from a network device and a change command from a target cell; and
the processor configured to
measure a signal measurement value of each candidate cell of the at least one candidate cell for handing over communications between the terminal and a network from a serving cell to a target cell, wherein the signal measurement value is related to a pilot signal;
determine, according to the signal measurement value of each of the candidate cells, whether a candidate cell of the at least one candidate cell triggers an intra-frequency measurement event that a pilot signal strength of the candidate cell is greater than that of the serving cell;

in response to determining that a candidate cell of the at least one candidate cell triggers a first intra-frequency measurement event indicating that a pilot signal strength of a cell is greater than that of a current serving cell, determine the candidate cell of the at least one candidate cell that triggers the first event as the target cell; and
in response to determining that the candidate cell of the at least one candidate cell triggers a second intra-frequency measurement event that is not the first event, select, according to a preset rule, a cell from at least one candidate cell whose signal measurement value is greater than that of the serving cell as the target cell;
perform, by using a preconfigured resource of the target cell, a serving cell change in the target cell according to the change command;
a transmitter configured to cooperate with the processor to report a first measurement report of the target cell to the network device for determining, according to the first measurement report, the candidate cell that triggers the first event as the target cell; or
report a second measurement report of the selected cell to the network device for determining, according to the second measurement report, the target cell from the at least one candidate cell whose signal measurement value is greater than that of the serving cell;
the receiver further configured to cooperate with the processor to receive a change command from the target cell to initiate handing over network communications from the serving cell to the target cell;
the processor further configured to perform a serving cell change in the target cell according to the change command;
the receiver further configured to cooperate with the processor to receive an update message from the network device; and
the processor further configured to delete the serving cell from the at least one candidate cell according to the update message.

18. The apparatus according to claim 17, wherein the preset rule comprises a requirement that the determined at least one candidate cell is the candidate cell with a largest signal measurement value.

19. The apparatus according to claim 17, wherein the transmitter is further configured to, during or before reporting the second measurement report to the network device, cooperate with the processor to report capability information to the network device for determining, according to the capability information, whether the terminal supports the serving cell change or preconfiguration of a resource by the target cell when any cell triggers the another intra-frequency measurement event except the first event.

20. The apparatus according to claim 17, wherein the second measurement report comprises cell information of the determined candidate cell, which enables the network device to determine the determined candidate cell to be the target cell according to the cell information.

21. The apparatus according to claim 17, wherein at least two of the at least one candidate cell are determined according to the preset rule, and the second measurement report comprises signal measurement values of the at least two determined candidate cells, which enable the network device to determine the target cell from the at least two determined candidate cells.

22. The apparatus according to claim 17, wherein the second measurement report further comprises a change request, which enables the network device to determine, according to the change request, whether to control the target cell to send the change command to the terminal.

23. The apparatus according to claim 17, wherein when there are at least two of the at least one candidate cells with the largest signal measurement value, the preset rule comprises a requirement that the determined at least one candidate cell is a candidate cell that is listed in a preset location of the second measurement report and has the largest signal measurement value.

24. A cell change method comprising:
sending, by a network device, a measurement control message to a terminal, enabling the terminal to obtain a signal measurement value of each candidate cell for handing over communications between the terminal and a network from a serving cell to a target cell, wherein the signal measurement value is related to a pilot signal;
receiving, by the network device, a first or second measurement report from the terminal,
wherein (a) the first measurement report indicates that a candidate cell triggers a first intra-frequency measurement event that a pilot signal strength of the candidate cell is greater than that of the serving cell and (b) the second measurement report indicates that the candidate cell triggers a second intra-frequency measurement event other than the first intra-frequency measurement event;
determining, by the network device, the candidate cell that triggers the first intra-frequency measurement event as the target cell in response to receiving the first measurement report; and
determining, by the network device, the target cell from at least one candidate cell whose signal measurement value is greater than that of the serving cell in response to receiving the second measurement report;
controlling, by the network device, the target cell to send a change command to the terminal, which is intended to enable the terminal to perform, by using a resource of the target cell, the serving cell change in the target cell according to the change command; and
sending, by the network device, an update message to the terminal for causing the terminal to delete the serving cell from the at least one candidate cell.

25. The method according to claim 24, further comprising:
receiving, by the network device, capability information reported by the terminal;
determining, by the network device, according to the capability information, whether the terminal supports the serving cell change or preconfiguration of a resource by the target cell when any cell triggers the intra-frequency measurement event except the first event, and
when it is determined that the terminal supports the serving cell change or the preconfiguration of a resource by the target cell, determining, according to the measurement report, the target cell from the at least one candidate cell whose signal measurement value is greater than that of the serving cell.

26. The method according to claim 24, wherein when receiving the measurement report from the terminal, before controlling the target cell to send the change command to the terminal, the method further comprises:
receiving, by the network device, the measurement report again from the terminal;
determining, by the network device, according to the measurement report, a new target cell from the at least one candidate cell whose signal measurement value is greater than that of the serving cell; and
controlling, by the network device, the new target cell to send a new change command to the terminal.

* * * * *

UNITED STATES PATENT AND TRADEMARK OFFICE
CERTIFICATE OF CORRECTION

| | | |
|---|---|---|
| PATENT NO. | : 10,863,406 B2 | Page 1 of 1 |
| APPLICATION NO. | : 16/101171 | |
| DATED | : December 8, 2020 | |
| INVENTOR(S) | : Xu et al. | |

It is certified that error appears in the above-identified patent and that said Letters Patent is hereby corrected as shown below:

On the Title Page

Page 2: Item (56) US Patents: Cite No 6: "2011/0098042 A1 4/2011 Tomasz et al." should read -- 2011/0098042 A1 4/2011 Mach et al. --.

Signed and Sealed this
Twenty-ninth Day of March, 2022

Drew Hirshfeld
*Performing the Functions and Duties of the*
*Under Secretary of Commerce for Intellectual Property and*
*Director of the United States Patent and Trademark Office*